(12) United States Patent
Moeller

(10) Patent No.: US 9,014,160 B2
(45) Date of Patent: *Apr. 21, 2015

(54) METHOD FOR PROVIDING A VALET MODE IN A VEHICLE

(75) Inventor: Douglas S Moeller, Santa Rosa, CA (US)

(73) Assignee: Autoner Mobile, Inc., Santa Rosa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,570

(22) Filed: Jul. 26, 2012

(65) Prior Publication Data

US 2012/0322462 A1  Dec. 20, 2012

Related U.S. Application Data

(63) Continuation-in-part of application No. 12/514,047, filed as application No. PCT/US2007/011632 on May 15, 2007, application No. 13/559,570, which is a continuation-in-part of application No. 13/414,935, filed on Mar. 8, 2012, which is a continuation-in-part of application No. 12/514,049, filed as application No. PCT/US2007/011624 on May 15, 2007, now Pat. No. 8,189,552.

(60) Provisional application No. 60/800,749, filed on May 16, 2006, provisional application No. 60/800,679, filed on May 16, 2006, provisional application No. 60/800,750, filed on May 16, 2006.

(51) Int. Cl.
*H04W 4/02* (2009.01)
*H04W 4/04* (2009.01)

(52) U.S. Cl.
CPC .............. *H04W 4/046* (2013.01); *H04W 4/021* (2013.01)

(58) Field of Classification Search
CPC .. B60R 25/10; B60R 25/1003; B60R 25/102; B60R 25/20; H04W 80/12; H04W 88/10; H04W 4/021–4/027; H04W 4/046
USPC ............ 370/310, 315–316, 328, 338; 455/73, 455/419; 701/1, 2, 36, 70, 408; 340/5.1–5.21, 6.1, 425.5–426.1, 340/426.13–426.25, 988–992, 996
See application file for complete search history.

(56) References Cited

U.S. PATENT DOCUMENTS

| | | | | |
|---|---|---|---|---|
| 5,825,283 | A | * 10/1998 | Camhi | 340/438 |
| 2005/0172230 | A1 | * 8/2005 | Burk et al. | 715/716 |
| 2006/0033610 | A1 | * 2/2006 | Martinez | 340/425.5 |

(Continued)

*Primary Examiner* — Un C Cho
*Assistant Examiner* — Jeremy Costin
(74) *Attorney, Agent, or Firm* — Donald J Lenkszus

(57) ABSTRACT

A method for providing a valet mode for a vehicle comprises: providing a mobile router in the vehicle; operating the mobile router to substantially continuously determine the current location of the vehicle; providing a valet application program to a wireless device; utilizing the valet application program to program the wireless device to provide a valet user interface; utilizing the valet user interface to activate and deactivate a valet mode at the mobile router; operating the mobile router such that when the valet mode is activated, the mobile router activates a predetermined a boundary of predetermined radius about the current location of the vehicle; automatically operating the mobile router when the valet mode is activated to detect if the boundary is exceeded; and operating the mobile router to automatically cause a notification to be sent to the wireless device upon the router detecting that the vehicle exceeds the boundary.

43 Claims, 9 Drawing Sheets

(56) References Cited

U.S. PATENT DOCUMENTS

| | | | |
|---|---|---|---|
| 2006/0176159 A1* | 8/2006 | Chu | 340/426.19 |
| 2008/0062120 A1* | 3/2008 | Wheeler et al. | 345/156 |
| 2008/0272910 A1* | 11/2008 | Anderson | 340/540 |
| 2010/0057481 A1* | 3/2010 | Fein et al. | 705/1 |
| 2011/0063099 A1* | 3/2011 | Miller et al. | 340/439 |
| 2012/0039248 A1* | 2/2012 | Schneider et al. | 370/328 |
| 2013/0211623 A1* | 8/2013 | Thompson et al. | 701/2 |

* cited by examiner

METHOD FOR PROVIDING A VALET MODE IN A VEHICLE

CROSS-REFERENCE TO RELATED APPLICATIONS

The present application is a continuation-in-part of U.S. patent application Ser. No. 12/514,047 filed as PCT Application No. PCT/US07/11632 filed on May 15, 2007 and claiming priority to U.S. provisional application Ser. No. 60/800,749, filed May 16, 2006, U.S. provisional application Ser. No. 60/800,679, filed May 16, 2006 and U.S. provisional application Ser. No. 60/800,750, filed May 16, 2006, said Ser. No. 12/514,047 claiming priority to U.S. provisional application. The present application is also a continuation-in-part of U.S. patent application Ser. No. 13/414,935 filed Mar. 8, 2012 that is a continuation-in-part of Ser. No. 12/514,049 filed Sep. 25, 2009, now U.S. Pat. No. 8,189,552 which is a 371 of PCT/US07/11624 filed May 15, 2007 and claiming priority to U.S. provisional application Ser. No. 60/800,749, filed May 16, 2006, U.S. provisional application Ser. No. 60/800,679, filed May 16, 2006 and U.S. provisional application Ser. No. 60/800,750, filed May 16, 2006.

FIELD OF THE INVENTION

The present invention relates to a networked vehicular wireless mobile router arrangement.

BACKGROUND

The use of mobile or wireless end-user computer-type devices has increased significantly. Such mobile devices must be able to connect to a wireless network. Wireless local area networks (LANs) are often deployed inside structures such as homes, offices, public and commercial buildings. A typical wireless LAN comprises one or more wireless access points, such as a wireless router or "hot spot", which communicates wirelessly with the mobile device, and allows the mobile device to connect to a wired network or other network that is also in communication with the access point. To stay connected to such a wireless LAN, the mobile device must usually stay within wireless communication range of the access points. This constrains the effective mobility of a wireless device.

The mobility constraining problem is particularly aggravated when the mobile device is disposed within a vehicle that is in motion. The mobility constraining problem has been addressed somewhat by use of cellular networks that allow mobile devices having cellular network interfaces to communicate wireless data with such cellular networks. However, most mobile computer devices do not have cellular network interfaces.

As the use of mobile devices has expanded, the mobility of such devices has expanded to the use wireless routers in vehicles. Such routers are referred to as "mobile routers" or "mobile nodes". Mobile routers typically permit a mobile device located in a vehicle that is in motion to maintain a connection to a wide area network and thereby greatly expand the mobility of the mobile device. Mobile routers are fully operable whether the vehicle having a mobile router installed therein is in motion or stationary. The mobile router may maintain connection to the Internet as it travels across cellular networks.

Still further, it would be advantageous to utilize the mobile router to determine that the vehicle in which the mobile router is disposed is not driven too far or too fast under certain circumstances.

One example of a set of such certain circumstances is when a vehicle is left in custody of a valet.

SUMMARY

In a particularly advantage embodiment of the invention each mobile router may be operated in a "valet mode" in conjunction with a wireless mobile device such as, for example, a so-called smart phone. We provide an application, i.e., a valet application, that may be downloaded to a smartphone or other wireless mobile device. The valet application is particularly advantageous with a smartphone or other wireless mobile device having a touch screen. The valet application programs the wireless mobile device to provide a valet mode control button or icon. Touching the button causes a command to be sent to a corresponding mobile router to enable a valet mode in the mobile router.

When the valet mode is enabled in a mobile router, a predetermined boundary is established for the mobile router based on its location at the time the valet mode is enabled. By way of example, the predetermined boundary may be a radius may of e.g., 100 yards from the vehicles location. If the vehicle leaves moves outside the boundary, the mobile router causes a message, e.g., a SMS message, to be sent to the wireless mobile device alerting that the boundary has been exceeded.

When the valet mode is enabled, the corresponding mobile router also monitors the speed of the vehicle. If the speed exceeds a predetermined speed, e.g., 65 mph, the mobile router causes a message, e.g., a SMS message, to be sent to the wireless mobile device alerting that the predetermined speed has been exceeded.

Both the predetermined radius and the predetermined speed are automatically configured in the mobile router.

The mobile router automatically disables the valet mode a predetermined time period, e.g. 4 hours, after it is enabled unless it is earlier disabled by the wireless mobile device.

The user of the wireless mobile device can change the predetermined default parameters for the radius, maximum speed, and time period.

An embodiment in accordance with the principles of the invention comprises: a wireless device having digital communication capability and comprising a user input/output interface comprising a touch screen display; and a valet mode application stored in the wireless device. The valet mode application is executable by the wireless device to provide control for a valet mode in cooperation with a mobile router disposed within a vehicle. The wireless device executes the valet application program to produce a predetermined image on the touch screen display. The touch screen display is operable such that touching the image is utilized to activate or enable and deactivate or disable a valet mode operation in the mobile router. The valet mode operates in the mobile router such that when the vehicle exceeds one or more predetermined conditions, the mobile router provides a notification to the wireless device.

The one or more predetermined conditions are preset in the mobile router.

The wireless device is operable to change the one or more predetermined conditions.

The predetermined conditions may comprise one or both of a boundary and a vehicle speed.

The valet mode remains activated for the shorter time of the wireless device deactivating the mobile router and a predetermined time period.

The predetermined time period is stored in the mobile router.

In certain embodiments, the wireless device is operable with the valet application program to change the predetermined time period.

In various embodiments, the predetermined image comprises one of a button and an icon. The wireless device is operable in response to a touch of the image activating the valet mode to cause an activation of the valet mode in the mobile router; and the wireless device is operable in response to a second touch of the image to cause deactivation of the valet mode in the mobile router.

In various embodiments, the wireless device comprises one of a cell phone, a smartphone, a personal data assistant ("PDA"), a tablet computer, a laptop, or a notepad or any similar type of device that provides for wireless digital communication.

In various embodiments, the valet application is downloaded to the wireless device.

The valet mode application is utilized to associate the wireless device with one or more mobile routers.

In one embodiment, an application for use with a wireless device comprising a touch screen display is provided. The application comprises a valet mode application stored by the wireless device. The valet mode application is executable by the wireless device to provide control for a mobile router valet mode, the mobile router disposed within a vehicle. The valet application program is executable by the wireless device to produce a predetermined image on the touch screen display. The valet application program is executable such that touching the image is utilized to activate and deactivate a valet mode operation in the mobile router. The valet mode operating in the mobile router such that when the vehicle exceeds one or more predetermined conditions, the mobile router provides a notification to the wireless device.

One embodiment of a mobile router comprises: a valet mode program to provide valet mode functionality in a vehicle in which the mobile router is disposed; a processor operable to execute the valet mode program; a predetermined distance limit; and a predetermined speed limit. The mobile router responds to externally generated commands from a predetermined source to activate or deactivate the valet mode. The processor is operable to determine if the predetermined distance limit is exceeded from the location of the vehicle when the valet mode is activated; and the processor is operable to determine if the vehicle exceeds the predetermined speed limit when the valet mode is activated.

The mobile router may comprise: a wireless wide area network interface operable to access a cellular network and a wireless local area network. The commands are received via one of the wireless wide area network and the wireless local area network.

The predetermined source that initiates the commands may be a wireless mobile device that executes a valet mode application.

The mobile router may comprise a predetermined time period. The processor deactivates the valet mode at the earliest of the predetermined time period and receipt of a deactivate command.

The mobile router may respond to externally generated second commands from the predetermined source to change the predetermined time period to a second predetermined time period.

The mobile router may respond to externally generated third commands from the predetermined source to change the predetermined distance limit to a second predetermined distance period.

The mobile router may respond to externally generated fourth commands from the predetermined source to change the predetermined speed limit to a second predetermined speed period.

In various embodiments, the predetermined distance limit and the predetermined speed limit are downloaded to the router via one of the wireless wide area network and the wireless local area network.

In various embodiments, the mobile router is operable to generate a message to the predetermined source if at least one of the predetermined speed limit or the predetermined distance is exceeded.

Another embodiment of a mobile router comprises: a stored predetermined distance limit; a stored predetermined speed limit; and access to a global positioning system (GPS) receiver. The mobile router utilizes the GPS receiver to substantially continuously determine the location of a vehicle in which the mobile router is disposed; and the mobile router is responsive to a first command to activate an operational mode such that the present location of the vehicle is captured, the vehicle location is substantially continuously utilized to determine if the vehicle location exceeds the predetermined distance limit from the captured location and to determine if the vehicle exceeds the predetermined speed limit.

The mobile router is responsive to the vehicle exceeding the predetermined distance from the captured location to send a message to a predetermined device.

The mobile router is responsive to the vehicle exceeding the predetermined speed to send a message to a predetermined device.

The mobile router is responsive to a second command to deactivate the operational mode.

The mobile router may comprise a stored predetermined time limit; and the mobile router deactivates the operational mode upon expiration of the predetermined time limit.

An embodiment of a vehicle in accordance with the principles of the invention comprises a valet mode program to provide valet mode functionality for the vehicle, a processor operable to execute the valet mode program, a predetermined distance limit, and a predetermined speed limit. The vehicle responds to externally generated commands from a predetermined source to activate or deactivate the valet mode. The processor is operable to determine if the predetermined distance limit is exceeded from the location of the vehicle when the valet mode is activated; and the processor is operable to determine if the vehicle exceeds the predetermined speed limit while the valet mode is activated.

The vehicle embodiment further may comprise: a wireless wide area network interface operable to access a cellular network and a wireless local area network. The commands are received via one of the wireless wide area network and the wireless local area network.

The predetermined source in the vehicle embodiment may comprise a wireless mobile device. The wireless mobile device comprises a valet mode application operable to activate and deactivate the valet mode.

The vehicle may further comprise a predetermined time period. The processor deactivates the valet mode at the earliest of the predetermined time period and receipt of a deactivate command. The processor responds to externally generated second commands from the predetermined source to change the predetermined time period to a second predetermined time period. The processor responds to externally generated third commands from the predetermined source to change the predetermined distance limit to a second predetermined distance period. The processor responds to externally generated fourth commands from the predetermined source to change the predetermined speed limit to a second predetermined speed period.

In an embodiment, the predetermined distance limit and the predetermined speed limit are downloaded to the vehicle via one of the wireless wide area network and the wireless local area network.

In various embodiments, the processor is operable to generate a message to the predetermined source if at least one of the predetermined speed limit or the predetermined distance is exceeded.

In one embodiment, a vehicle comprises: a stored predetermined distance limit; a stored predetermined speed limit; access to a global positioning system (GPS) receiver; and a mobile router. The processor utilizes the GPS receiver to substantially continuously determine the location of the vehicle; and the processor is responsive to a first command to activate an operational mode such that the present location of the vehicle is captured, the vehicle location is substantially continuously utilized to determine if the vehicle location exceeds the predetermined distance limit from the captured location and to determine if the vehicle exceeds the predetermined speed limit.

The processor may be responsive to the vehicle exceeding the predetermined distance from the captured location to send a message to a predetermined device.

The processor may be responsive to the vehicle exceeding the predetermined speed to send a message to a predetermined device.

The processor may be responsive to a second command to deactivate the operational mode.

In various embodiments, the vehicle comprises a stored predetermined time limit, and the processor deactivates the operational mode upon expiration of the predetermined time limit.

The processor may be responsive to a second command to deactivate the operational mode.

In embodiments, the vehicle comprises: a wireless wide area network interface (WAN) and a wireless local area network interface (WLAN).

The processor may receive the first command via one of the wireless WAN or WLAN.

The processor may receive the second command via one of the wireless WAN or WLAN.

The processor is operable to receive a substitute predetermined distance limit and to utilize the substitute predetermined distance limit in place of the predetermined distance limit.

In various embodiments, the vehicle is operable to receive a substitute predetermined speed limit and to utilize the substitute predetermined speed limit in place of the predetermined speed limit. The vehicle is also operable to receive a substitute predetermined distance limit and to utilize the substitute predetermined distance limit in place of the predetermined distance limit.

An embodiment of a method for providing a valet mode for a vehicle comprises: providing a mobile router in the vehicle; operating the mobile router to substantially continuously determine the current location of the vehicle; providing a valet application program to a wireless device; utilizing the valet application program to program the wireless device to provide a valet user interface; utilizing the valet user interface to activate and deactivate a valet mode at the mobile router; operating the mobile router such that when the valet mode is activated, the mobile router activates a predetermined a boundary of predetermined radius about the current location of the vehicle; automatically operating the mobile router when the valet mode is activated to detect if the boundary is exceeded; and operating the mobile router to automatically cause a notification to be sent to the wireless device upon the router detecting that the vehicle exceeds the boundary.

The method may comprise providing the valet application program to the wireless device as a downloadable program from a source accessed via the Internet.

The method may comprise: operating the mobile router in the valet mode for a predetermined period of time after the valet mode is activated; and automatically deactivating the valet mode upon expiration of the predetermined period.

The method may comprise utilizing the valet user interface to select the predetermined radius.

The method may further comprise storing the predetermined radius in the mobile router.

In various embodiments, the method may comprise coupling the router to a standardized vehicle bus, and obtaining distance traveled by the vehicle from the vehicle bus.

In other embodiments, the method may comprise: providing the vehicle with a global positioning system (GPS) receiver coupled to the router; and utilizing the GPS receiver in cooperation with the router to obtain distance traveled by the vehicle.

In various embodiments, the wireless device comprises at least one of a link to a wireless local area network and a link to a wireless wide area network. The method may further comprise downloading the valet application program to the wireless device via one of the device wireless local area network and the wireless wide area network.

The method may further comprise: operating the wireless device to activate the valet mode at the mobile router via one of the device wireless local area network and the device wireless wide area network; and deactivating the mobile router valet mode via one of the mobile router local area network and the mobile router wireless wide area network.

The method may further comprise operating the mobile router to send a notification message to the wireless device via one of a mobile router local area network and a mobile router wireless wide area network when the mobile router detects the one or both of the boundary and the maximum speed limit are exceeded.

Still further the method may comprise: providing the vehicle with a global positioning system (GPS) receiver coupled to the router; and operating the router to utilize the GPS receiver to obtain distance traveled by the vehicle.

The method may comprise operating the mobile router to send a notification message to the wireless device when the mobile router detects that the predetermined radius is exceeded.

In embodiments, the method may comprise operating the mobile router in the valet mode for a predetermined period of time after the valet mode is activated; and automatically deactivating the valet mode upon expiration of the predetermined period.

Embodiments may comprise utilizing the valet user interface to select the predetermined radius and the predetermined period of time.

Another embodiment of a method for providing a valet mode for a vehicle comprises: providing a mobile router in the vehicle, the mobile router comprising a wireless wide area network interface and a wireless local area network interface; providing the vehicle with a global positioning system GPS receiver; coupling the GPS receiver to the mobile router; providing a valet application program to a wireless device comprising a touch screen display, the wireless device having access to at least one of a wireless local area network and a wireless wide area network; utilizing the valet application program to produce an image of a button on the touch screen display; utilizing the button to activate and deactivate a valet mode such that when the valet mode is activated, the mobile router and the GPS receiver cooperate to establish a predetermined radius about the current location of the vehicle; and operating the mobile router in cooperation with the GPS receiver to detect if the GPS receiver indicates that the predetermined radius is exceeded.

The method of the embodiment may include: operating the mobile router to send a notification message to the wireless device when the mobile router detects the geo-fence boundary is exceeded; and may further include operating the mobile router in the valet mode for a predetermined period of time after the valet mode is activated; and automatically deactivating the valet mode upon expiration of the predetermined period.

In a further embodiment, a method for providing a valet mode for a vehicle comprises: providing a mobile router in the vehicle, the mobile router comprising a wireless wide area network interface and a wireless local area network; operating the mobile router to substantially continuously determine the current location of the vehicle; providing a valet application program to a wireless device programmable to comprise a customizable user interface, the wireless device having access to at least one of a wireless local area network and a wireless wide area network; utilizing the valet application program to program the wireless device to provide a valet user interface; utilizing the valet user interface to activate and deactivate a valet mode at the mobile router; operating the mobile router such that when the valet mode is activated, the mobile router activates a predetermined a boundary of predetermined radius about the current location of the vehicle and a maximum speed limit for the vehicle; operating the mobile router to detect if the vehicle the geo-fence boundary or the speed limit are exceeded; and operating the mobile router to cause a notification to be sent to the wireless device upon the router detecting if the vehicle exceeds the geo-fence or the speed limit.

The method may further comprise: coupling the router to a standardized vehicle bus; obtaining distance traveled by the vehicle from the vehicle bus; and obtaining vehicle speed from the vehicle bus.

The method may comprise: providing the vehicle with a global positioning system (GPS) receiver coupled to the router; utilizing the GPS receiver in cooperation with the router to obtain distance traveled by the vehicle; and utilizing the GPS receiver in cooperation with the router to obtain vehicle speed from the vehicle bus.

One embodiment of a method for providing a valet mode for a vehicle comprises: providing a mobile router in the vehicle, the mobile router comprising a wireless wide area network interface and a wireless local area network interface; providing the vehicle with a global positioning system GPS receiver; coupling the GPS receiver to the mobile router; providing a valet application program to a wireless device comprising a touch screen display, the wireless device having access to at least one of a wireless local area network and a wireless wide area network; utilizing the valet application program to produce an image of a button on the touch screen display; utilizing the button to activate and deactivate a valet mode such that when the valet mode is activated, the mobile router and the GPS receiver cooperate to establish a boundary of predetermined radius about the current location of the vehicle and a maximum speed limit for the vehicle; and operating the mobile router in cooperation with the GPS receiver to detect if the GPS receiver indicates that boundary or the speed limit are exceeded.

The method further comprises: operating the mobile router to send a notification message to the wireless device when the mobile router detects the one or both of the boundary and the maximum speed limit are exceeded.

A method of operating a network comprising a plurality of mobile routers each disposed in a corresponding vehicle is provided. The method comprises: downloading a valet mode application to a wireless mobile device; utilizing the valet mode application to program the wireless device to provide a valet user interface; associating one or more of the mobile routers to the wireless mobile device; providing each associated one or more mobile routers with a valet mode program; operating each associated one of more mobile routers to substantially continuously determine the current location of its the corresponding vehicle; utilizing the valet user interface to selectively activate and deactivate a valet mode at a predetermined one mobile router of the associated one or more of the mobile routers; operating the predetermined one mobile router such that when the valet mode is activated, the predetermined one mobile router saves the current location; operating the predetermined one mobile router such that when the valet mode is activated, the predetermined one mobile router monitors at least one of the location of the corresponding vehicle to determine if the vehicle travels beyond a predetermined radius about the current location of the vehicle and the speed of the vehicle to determine if the vehicle travels at a speed in excess of a predetermined speed; and operating the predetermined one mobile router to automatically cause a notification to be sent to the wireless mobile device in the event that the predetermined one mobile router detect that the corresponding vehicle exceeds the predetermined radius or the predetermined speed.

The method may further include downloading the valet application to the wireless device from a source accessed via the Internet.

In one embodiment, the method further comprises: operating the predetermined one mobile router in the valet mode for a predetermined period of time after the valet mode is activated; and automatically deactivating the valet mode upon expiration of the predetermined period.

In various embodiments, the method may include: utilizing the valet user interface to select at least one of the predetermined radius and the predetermined speed.

The method may comprise: storing the selected predetermined radius and the predetermined speed in the predetermined one mobile router.

In some embodiments, the method comprises: coupling the predetermined one mobile router to a standardized vehicle bus of the corresponding vehicle; and obtaining distance and speed data from the vehicle bus.

Such embodiments may further comprise: providing the corresponding vehicle with a global positioning system (GPS) receiver coupled to the predetermined one mobile router; and utilizing the GPS receiver in cooperation with the predetermined one mobile router to obtain distance traveled by the corresponding vehicle.

In various embodiments, the wireless mobile device comprises at least one of a link to a wireless local area network and a link to a wireless wide area network. The method may comprise: downloading the valet application program to the wireless mobile device via one of the device wireless local area network and the wireless wide area network.

The method may include: operating the wireless mobile device to activate the valet mode at the predetermined one mobile router via one of the device wireless local area network and the device wireless wide area network; and activating the predetermined one mobile router the valet mode via one of a mobile router local area network and a mobile router wireless wide area network. The method may further include: operating the wireless device to deactivate the valet mode at the predetermined one mobile router via one of the device wireless local area network and the device wireless wide area network; and deactivating the predetermined one mobile router the valet mode via one of the mobile router local area network and the mobile router wireless wide area network.

The embodiments may include: operating the predetermined one mobile router to send a notification message to the wireless device when the predetermined one mobile router detects that one of the predetermined radius and the predetermined speed is exceeded.

In certain embodiments, the method comprises: providing the corresponding vehicle with a global positioning system (GPS) receiver coupled to the predetermined one mobile router; and operating the predetermined one mobile router to utilize the GPS receiver to determine at least one of the current location of the corresponding vehicle and the speed of the corresponding vehicle.

The embodiments may include: operating the predetermined one mobile router to send a notification message to the wireless mobile device if the mobile router detects that one of the predetermined radius and the predetermined speed is exceeded.

The embodiments may further include: operating the predetermined one mobile router in the valet mode for a predetermined period of time after the valet mode is activated; and automatically deactivating the valet mode upon expiration of the predetermined period.

The method may further comprise: utilizing the wireless mobile device the valet user interface to select at least one of the predetermined radius, the predetermined speed, and the predetermined period of time.

The method may even further include: storing the at least one of the selected predetermined radius and the selected predetermined period of time in the predetermined one mobile router.

In yet another embodiment, a method is provided for operating a network comprising a plurality of mobile routers each disposed in a corresponding vehicle, and each mobile router comprising a wireless wide area network interface and a wireless local area network interface. The method comprises: downloading a valet mode application to a wireless mobile device; utilizing the valet mode application to program the wireless mobile device to provide a valet user interface. The wireless mobile device comprising a touch screen display and has access to at least one of a device wireless local area network and a device wireless wide area network. The method further comprises: utilizing the valet mode application to produce an image of a button on the touch screen display; associating one or more of the mobile routers to the wireless mobile device; providing each associated one or more the mobile routers with a valet mode program; coupling a global positioning system (GPS) receiver to the mobile router; utilizing the button to activate and deactivate a valet mode such that when the valet mode is activated, the mobile router and the GPS receiver cooperate to establish a predetermined radius about the current location of the vehicle; and operating the mobile router in cooperation with the GPS receiver to detect if the predetermined radius is exceeded.

An embodiment of a method of operating a network comprising a plurality of mobile routers each disposed in a corresponding vehicle and each comprising a wireless wide area network interface and a wireless local area network interface comprises: downloading a valet mode application to a wireless mobile device; utilizing the valet mode application to program the wireless mobile device to provide a customizable user interface. The wireless mobile device comprises a touch screen display, and has access to at least one of a device wireless local area network and a device wireless wide area network. The method further comprises: utilizing the valet mode application to produce an image of a button on the touch screen display; associating one or more of the mobile routers to the wireless mobile device; providing each associated one or more the mobile routers with a valet mode program; utilizing the button to activate and deactivate a valet mode such that when the valet mode is activated, the mobile router establishes a predetermined radius about the current location of the corresponding vehicle and a predetermined speed; operating the mobile router to substantially continuously determine the current location of the corresponding vehicle; operating the mobile router to detect if the predetermined radius or the predetermined speed is exceeded; and operating the mobile router to cause a notification to be sent to the wireless device upon the router detecting if the predetermined radius or the predetermined speed is exceeded.

BRIEF DESCRIPTION OF THE DRAWING

The invention will be better understood by reading the following detailed description in conjunction with the drawing figures in which like designators refer to like elements, and in which.

DETAILED DESCRIPTION

Figure 1:
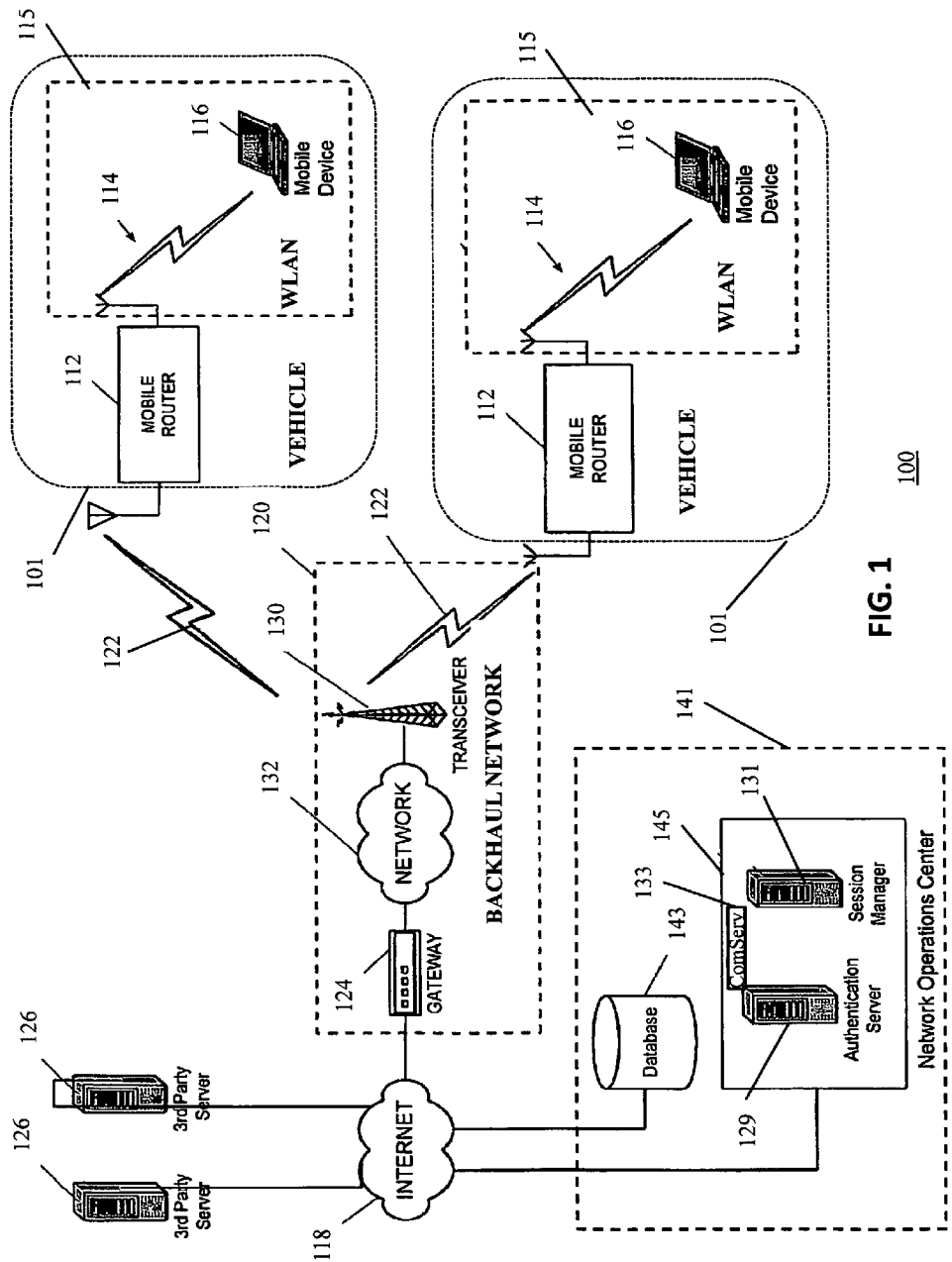
FIG. 1 is a block diagram of a first mobile router network arrangement.

FIG. 1 is a diagram of a mobile router network 100. Mobile router network 100 comprises a plurality of vehicles 101, each having therein a mobile router 112. Each vehicle 101 includes a wireless local area network 115. Each wireless local area network 115 may be in communication with one or more corresponding mobile devices 116 via a wireless communication link 114. Each wireless local area network 115 includes mobile router 112 and may or may not include one or more mobile devices 116. Each wireless local area network 115 may be, for example, a network compliant with industry standard IEEE 802.11 network, i.e., a Wi-Fi network, or a network compliant with industry standard IEEE 802.16, i.e., a WiMAX network, or a Bluetooth network, or any other suitable wireless network.

Each mobile device 116 may be any processor-based device having a wireless transceiver capable of receiving and transmitting data via the wireless communication link 114. For example, one mobile device 116 may be a laptop (or notebook) computer equipped with a wireless network interface card, a wireless-enabled PDA, a pocket or palmtop computer, a Wi-Fi phone (e.g., a Skype phone or VoIP phone), a Wi-Fi appliance, a Sony PlayStation PSP or some other portable, network-enabled gaming station, a video screen, a digital camera, an audio player, a navigation device, a security camera, an alarm device, a wireless payment or POS device, or an automotive electronic device.

Mobile router 112 may act as a gateway between wireless network 115 and a backhaul network 20. In one embodiment, backhaul network 120 is a cellular wireless network. Backhaul network 120 in turn may be connected to the Internet 118 or any other network, such as an intranet or another WAN, via a gateway 24.

Mobile router 112 communicates with the backhaul network 120 via a backhaul wireless communication link 122. Backhaul wireless communication link 122 may be provided by a wireless network that is part of the backhaul network 120, such as a cellular wireless network. The cellular wireless network may be of any type.

Examples of such types of cellular network, include but are not limited to the following types: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Each mobile router 112 and its corresponding mobile device 116 are co-located in a vehicle 101 so that each mobile router 112 is capable of being mobile and operable to establish connectivity whether mobile or stationary such that each end-user of a mobile device 116 in a vehicle 101 can enjoy wireless connectivity to Internet 118 via mobile router 112 in vehicle 101 as the vehicle 101 travels through cells or nodes associated with wireless network 122. Vehicle 101 may be any type of vehicle that travels over and/or under land, over and/or under water, or in the air or space. The typical most common type of vehicle 101 that is likely to include a mobile router is a car, truck, or bus.

Each mobile router 112 may be mounted in a corresponding vehicle 101 in a secure and generally tamper-resistant location. For example, if vehicle 101 is an automobile, mobile router 112 may be mounted in the trunk of the automobile, and the end-user of the mobile device 116 may be a passenger or driver of the automobile. That way, the end-user could enjoy wireless connectivity as the automobile moves between cells of the wireless network 122.

Although only one mobile device 116 is shown in communication with each mobile router 112 shown in FIG. 1, numerous mobile devices 116 may be in communication with a corresponding mobile router 112 via the corresponding local area network 115.

Cellular network cell site transceiver 130 may be used to provide a cellular link to mobile router 112 and both receive and transmit wireless signals to a mobile router 112 via one of the wireless cellular communication links 122. A cellular communication network 132 of cellular backhaul network 120 may communicate via the worldwide web or Internet 118 or another network via one or more gateways 124. Each communication network 132 may include conventional communication network elements to provide wireless cellular network service for each mobile router 112.

Figure 2:
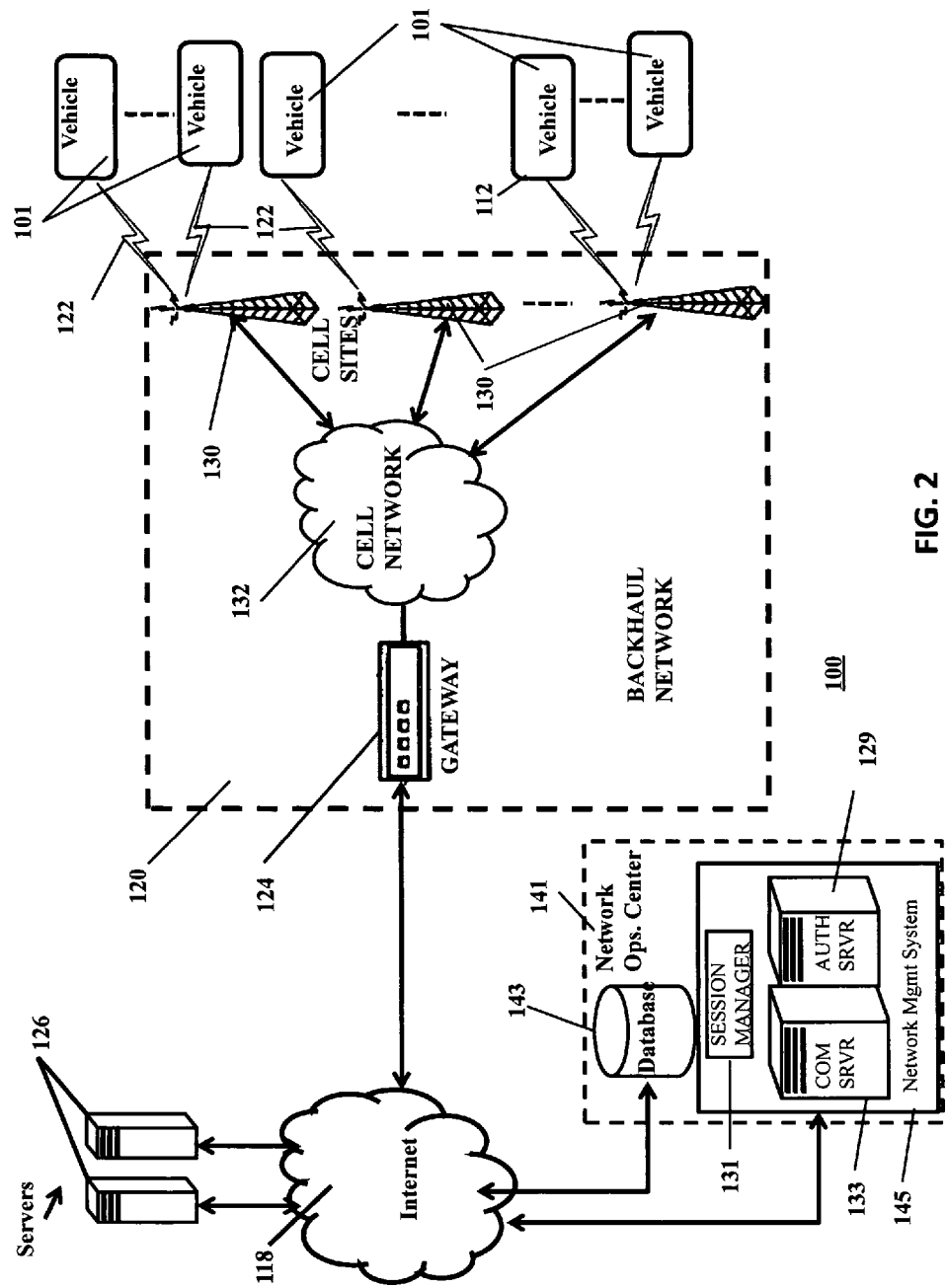
FIG. 2 is a block diagram of an expanded mobile router network arrangement.

Turning now to FIG. 2, mobile router network 100 is shown in a more expanded networked arrangement in which cellular backhaul network 120 is shown as having a plurality of cell site transceivers 130, each of which can communicate with one or more vehicles 101 having a mobile router 112 therein. FIG. 2 shows one gateway 124 to Internet 118, but it will be appreciated that there may be a plurality of such gateways 124, each of which may have access to the Internet 118 or to another network.

Figure 3:
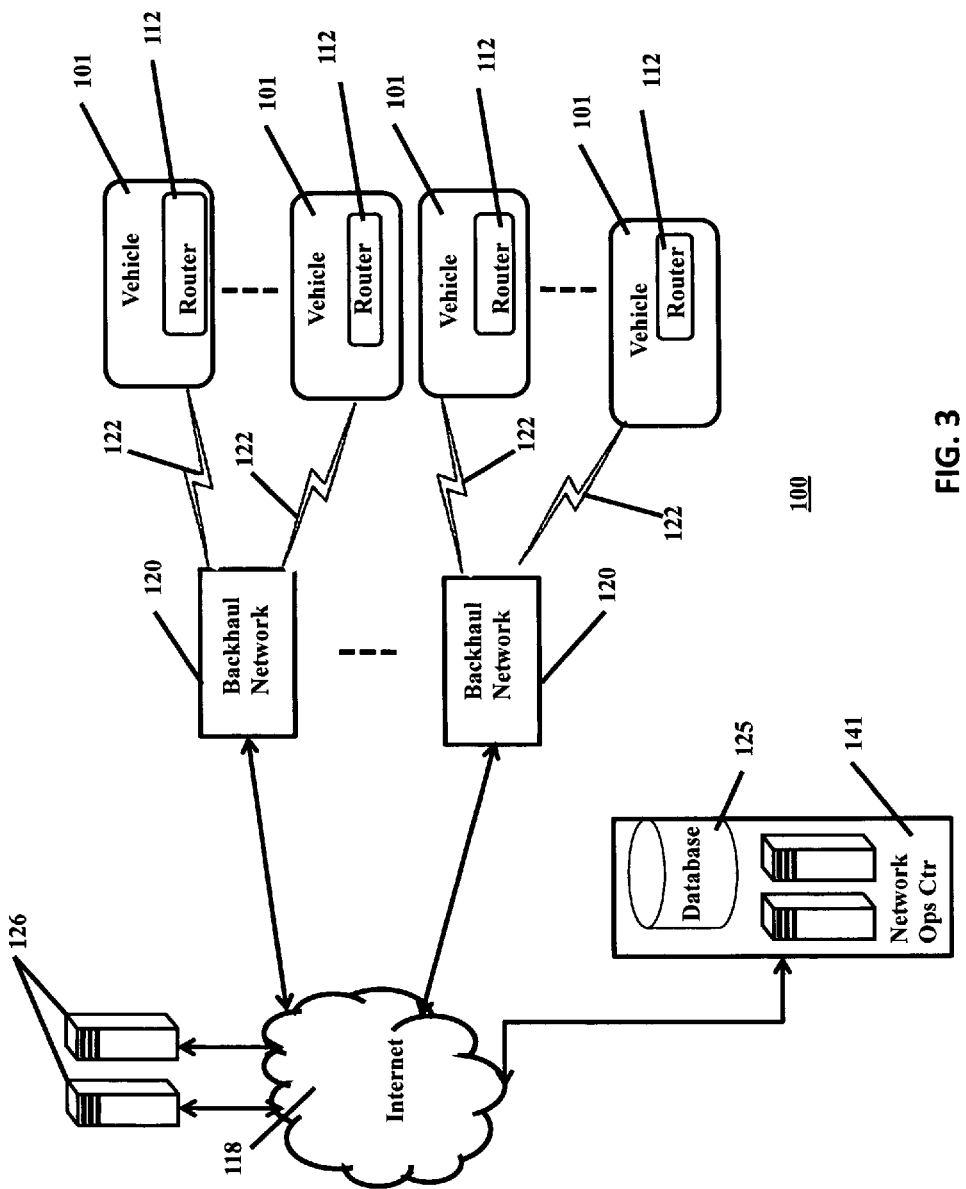
FIG. 3 is a block diagram of a further expanded mobile router network arrangement.

Turning now to FIG. 3, mobile router network 100 is illustrated in further expanded form to show that there may be a plurality of cellular backhaul networks 120 each comprising a number of cell site transceivers, each located in different areas serviced by the backhaul networks 120, such that each mobile router 112 may stay in communication with a backhaul network 120 as each mobile router 112 moves between cells or nodes of the backhaul networks 120. It will be appreciated by those skilled in the art, that there is virtually no limit to the size of mobile router network 100.

Each of FIGS. 1 through 3 shows that mobile router network 110 comprises at least one network operations center 141. Network operations center 141 comprises a database 143 and a network management system 145. Network management system 145 is a combination of hardware and software used to monitor and administer or otherwise manage mobile router network 100. Each mobile router 112 is managed as an individual network element.

Network management system 145, comprises an authentication server 129, a session manager 131, and a communication server 133. Communication server 133 is a combination of hardware and software used to manage communications between mobile routers 120, and network management system 145.

Figure 4:
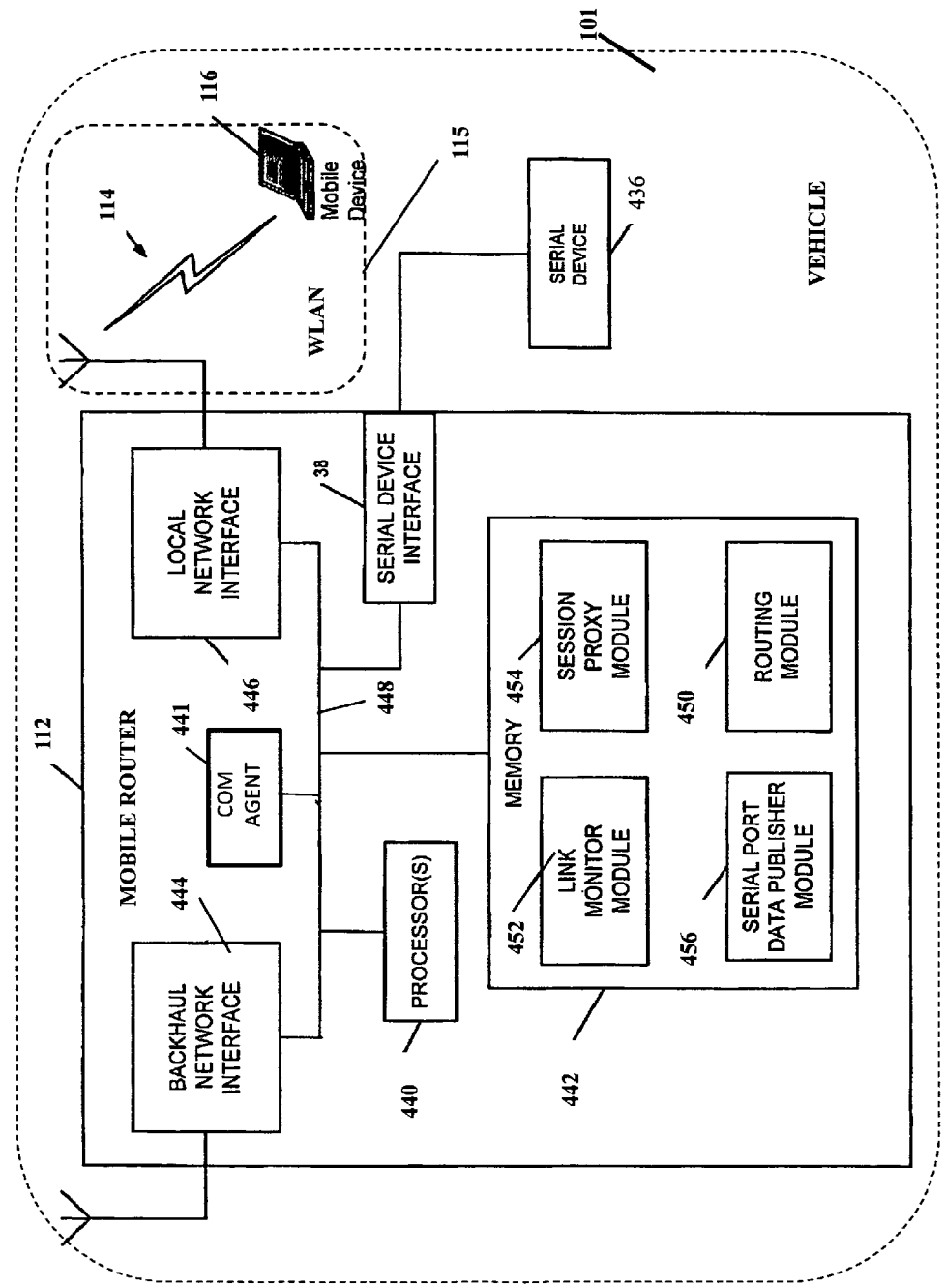
FIG. 4 is a block diagram of a mobile router.

FIG. 4 is a simplified block diagram of a mobile router 112 situated in a vehicle 101. Mobile router 112 comprises processor 440, one or more memory units 442, a backhaul network interface or wide area network interface or cellular network interface 444, and a local network interface 446. A system bus 448 interconnects processor 440, memory units 442, backhaul network interface 444 and local network interface 446.

Backhaul or cellular network interface 444 interfaces with and provides a wireless communication link with backhaul or cellular network 120 via cell site transceiver 130. Backhaul or cellular network interface 444 may interface with one or more types of wireless cellular communication links 122. For example, the backhaul cellular network interface 444 may interface to any one or more of: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Local network interface 446 interfaces and provides a wireless communication link 114 with wireless local area network 115. Similarly, local network interface 446 may interface to one or more types of wireless network links 114 such as a Wi-Fi, WiMAX, or Bluetooth link.

Processor 440 may execute various programs or instruction code stored in memory 442. Memory 442 may comprise one or more types of computer-readable media. As such, memory 442 may comprise one or more memory chips, optical memory devices, magnetic memory devices, or other memory devices.

Various programs or program modules or applications are executable by processor 440. The program modules include a routing module 450, a link monitor module 452, a session proxy module 454, and a serial port data publisher module 456. The program modules 450, 452, 454, 456 may be stored in portions of memory 442 or in one or move separate memories.

Routing module 450 is executed by processor 440 to route data packets between wireless network 415 and backhaul or cellular network 420. Link monitor program 452 monitors cellular communication links 122 (layer 2) and also Internet communication links (layer 3) via backhaul or cellular network 120 by sending test or probing data packets and monitoring for responses thereto. By monitoring the sending and receiving of test packets and responses, processor 440 executing link monitor program 452 detects if either (or both) of cellular communication link or Internet 118 link fails.

When processor 440, executing link monitor module 52, detects a drop-off, the dropped link is automatically reestablished to minimize the interruption in service to the end user.

In many prior art mobile routers, when communications links are lost, the end-user's applications and network sessions are terminated. The end-user has to restart the applications and/or session when the communications links and network connection are reestablished.

When processor 440 detects a failure in one or both of the communications link 122 or Internet 118 link, processor 440 initiates remedial action by attempting to reestablish the link or links. Processor 440 may reestablish the link before any applications on the corresponding mobile device 116 have to be restarted. That way, the user does not have to restart the applications or sessions. The user just typically notices that the applications/sessions slowed for a brief period of time while the connection was being reestablished.

Link monitor module 452, as executed on processor 440, provides adaptive programming. If backhaul or cellular network interface 44 receives data packets over backhaul wireless communication link 122, processor 440 sends fewer probing test data packets. Conversely, if backhaul or cellular network interface 444 does not receive data packets, processor 440 sends more probing test data packets. By monitoring data packets received via backhaul or cellular network interface 444, processor 440 determines that the interface is functioning. Accordingly, processor 440 sends data test packets less frequently.

Processor 440, executing link monitor module 452, monitors backhaul network interface 444 to determine that data packets are received. If processor 440 determines that backhaul wireless communication link 122 is working, then processor 440 sends fewer active probes on the backhaul or cellular network 120.

Processor 440, by executing session proxy module 454 acts as a session proxy for all TCP sessions going through mobile router 112. When a mobile device 116 seeks to establish a TCP session with a destination such as a third party server 126 coupled to Internet 118, 440 terminates the TCP session coming from mobile device 116 and, instead, establishes a TCP session via backhaul network interface 444 with the destination. Mobile router 112 also maintains a separate TCP session with mobile device 116 via local wireless communication link 114.

All end-user traffic between mobile device 116 and the destination is transparently routed through mobile router 112 during the two separate sessions. If one session such as the backhaul wireless communication link 122 goes down that does not negatively affect the session between the mobile router 112 and mobile device 116. As a result, processor 440 executing session proxy program module 454 maintains a TCP session to mobile device 116. If applications running on mobile device 116 are dependent upon a TCP session, the applications may continue to run because there is a TCP session with the mobile router 112, even though the TCP session over the backhaul or cellular wireless communication link 122 is lost. When communications via backhaul or cellular communication link 122 are reestablished, mobile device 116 is able to keep running its applications and session without having to restart the applications.

When communication over backhaul network or cellular communication link 122 is interrupted, processor 440, executing session proxy program module 454, prevents the TCP session for wireless communication link 114 to mobile device 116 from starting its back-off timers. Under TCP protocol, mobile device 116 would normally assume that it cannot forward packets because of network congestion and it would accordingly start to slow down the session. In contrast, processor 440 executing session proxy module 454 maintains a TCP session between mobile router 112 and mobile device 116. Mobile 116 device does not assume that network congestion is a problem and the TCP session between mobile router 112 and mobile device 116 does not slow down.

Execution of session proxy module 454 by processor 440 may be disabled by mobile device via a control panel for mobile router 112 displayed on mobile device 116. A user can disable execution of session proxy program module 454 when the user wants to maintain a TCP session with the destination.

Processor 440, when executing serial port data publisher module 456, makes data received from a serial device 436 connected to a serial port 438 available via mobile router 112 as a TCP stream or as some other type of data stream, such as HS-TCP or SCPS data stream. A remote database 125, as shown in FIG. 1 may be populated with the data from device 436 via backhaul or cellular network 120 and Internet 118 so that data from serial device 436 can be remotely accessed via the Internet 118.

Serial device 436 may communicate with mobile router 112 using any suitable serial data protocol, including the USB (Universal Serial Bus) standard, the RS-232 standard, the RS-485 standard, or the IEEE 1394 (FireWire) standard, for example.

Serial device 436 may be any suitable type of serial device, such as, for example, a GPS receiver. Other types of serial data devices 436 may be used. Serial device 436 may be a vehicle telematics device that captures data regarding the performance and operation of the vehicle (e.g., diagnostic data) in which the device is installed. Serial device 436 may be a point-of-sale (POS) device that captures sale or payment information.

Serial data device 436 may also be a remote control for an in-car entertainment system that enables downloading music, video, games, etc., to third party systems or a device for interfacing to communication systems.

Rather than transmitting the data to a central server, e.g., database 125 shown in FIG. 1, a remote user could access mobile router 112 to access the data from serial device 436 directly. In one embodiment, an authenticated remote user could access an authentication server 123 as shown in FIG. 1 to determine the address of a specific one mobile router 112. The remote user could then use that address to communicate with mobile router 112 directly. Similarly, a local end-user of the mobile router 112 could access the data from the serial device via the local wireless network 114.

Processor 440 can output data and command signals via serial interface 438 to serial device 436. Utilizing serial interface 438, processor 440 may activate and control various components and/or systems of a vehicle 101. Serial device 436 may be able to shut of the vehicle engine, unlock the doors, activate alarm functions, etc. Serial device 436 may also, according to various embodiments, perform payment functions, download data, receive advertising, entertainment, gaming, and/or information, as well as perform network management and control.

Each mobile router 112 includes a communication agent 441. Communication agent 441, in the embodiment shown, is a program executed by processor 440, but in other embodiments, communication agent 441 may be a separate processor and program. Communication agent 441 cooperatively operates with communication server 133 shown in FIG. 1.

Processor 440 of each mobile router 112 has the ability to run applications that can perform functions and collect data independently of whether or not mobile router 112 is linked to network management system 120.

Each mobile router has associated with it a specific identifier that is maintained in database 145. The specific identifier can be any unique identifier such as a router serial number or a vehicle identification number. Network operations center 141, utilizing communication server 133, is capable of selectively communicating with each mobile router 112.

Advantageously, the selective communication between each mobile router 112 and network operation center 141 permits the downloading of application programs such as a valet program 565 as described in detail herein below to each of mobile routers 112 for storage in memory 442 on a selective basis, the communication of data obtained from each router 112 as a consequence of execution of a downloaded application program, and/or the communication of statistical information obtained in or by a mobile router as a result of execution of an application program.

In addition, network operation center 141 is operable to facilitate the downloading of application programs ordered by or for each mobile router 112 directly or indirectly from third party servers 126.

Network operations center 145 also sends predetermined commands to specific predetermined specific mobile routers 112 for immediate execution or for execution at a predetermined specified interval.

Figure 5:
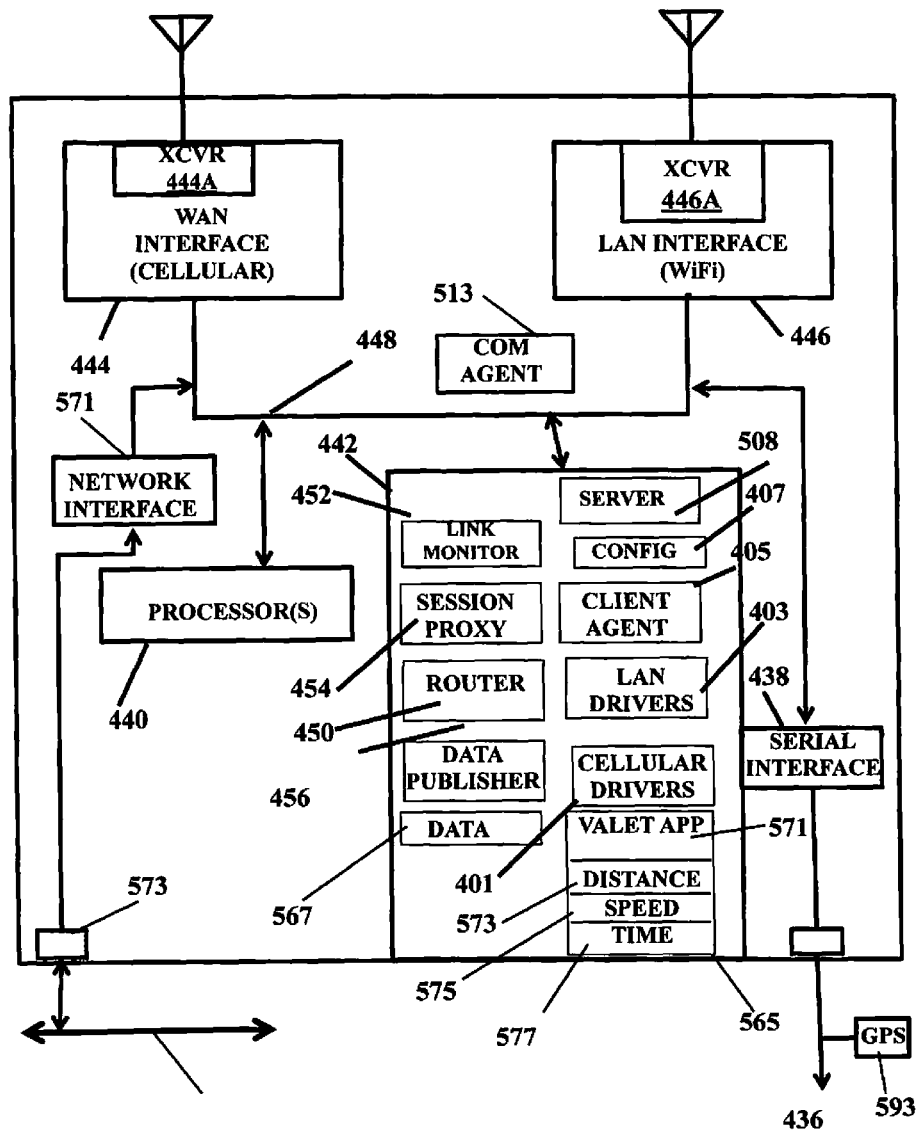
FIG. 5 is a more detailed block diagram of the mobile router of FIG. 4.

As shown in FIG. 5 each mobile router 112 stores application programs in memory 565. Each mobile router 112 is operable to collect data utilizing application programs 565 as well as from interfaces to the vehicle in which mobile router 12 is installed and/or from peripherals 430 coupled to mobile router 112 via serial data interface 438 and/or from mobile device 16. The collected data is marked with a timestamp and stored in memory 442 of mobile router 112. Depending on the nature of the data, mobile router 112 may process the data and prepare the resulting processed data for upload or mobile router 112 may prepare the data immediately for upload to network management system 120. In accordance with one embodiment, the data may be provided by a telematics device or devices.

In certain embodiments, each vehicle 101 includes a vehicle network bus 591 that typically utilizes a standardized protocol over which data or commands may be communicated with various sensors, nodes, processors and other vehicular apparatus coupled to the vehicle network bus.

Vehicle network bus 591 is a specialized internal communications network that interconnects components inside a vehicle (e.g. automobile, bus, train, industrial or agricultural vehicle, ship, or aircraft). Special requirements for vehicle control such as assurance of message delivery, assured non-conflicting messages, assured time of delivery as well as low cost, EMF noise resilience, redundant routing and other characteristics are met with the use of various standardized networking protocols.

Standardized vehicle network bus protocols include Controller Area Network (CAN), Local Interconnect Network (LIN) and others.

Vehicle network bus 591 provides access to the various vehicle electronic control modules in the vehicle. Some of the typical electronic modules on today's vehicles are the Engine Control Unit (ECU), the Transmission Control Unit (TCU), the Anti-lock Braking System (ABS) and body control modules (BCM).

A vehicle electronic control module typically gets its input from sensors (speed, temperature, pressure, etc.) that it uses in its computation. Various actuators are used to enforce the actions determined by the module (turn the cooling fan on, change gear, etc.). The electronic control modules need to exchange data among themselves during the normal operation of the vehicle. For example, the engine needs to tell the transmission what the engine speed is, and the transmission needs to tell other modules when a gear shift occurs. This need to exchange data quickly and reliably led to the development of vehicle network bus 591. Vehicle network bus 591 is the medium of data exchange.

Vehicle network bus 591 is utilized to create a central network in the vehicle 101. Each electronic control modules is 'plugged' into the network and can communicate with any other electronic control module installed on the network via vehicle network bus 591. Each electronic control module controls specific components related to its function and communicates with the other modules as necessary, using a standard protocol, over the vehicle network bus 591.

In addition, vehicle network bus 591 may utilize any one of a number of physical transmission media, including, but not limited to: single wire, twisted pair, and fiber optic.

Each mobile router 112 includes a vehicle network bus interface 571 and a connector 573 that connects to the vehicle network bus 591 of vehicle 101.

Each vehicle 101 comprises a vehicle network bus 591 and a mobile router 112. Mobile router 112 comprises a local area network interface 446 comprising a first wireless transceiver 446A of a first predetermined type to provide a link 114 to first a local area network 114 and a wide area network interface 444 comprising a second wireless transceiver 444A of a second predetermined type to provide a link 122 to a wide area network 122. The embodiment further comprises processor 440 to control operation of the local area network interface 446 and the wide area network interface 444. One of the wide area network interface 444 and the local area network interface 446 is selectively operable to establish a wireless communication link with network management system 141 comprising a communication server 133. Each mobile router 112 further comprises a communication agent 513, and an application 565 executable by the 440 to selectively acquire predetermined data from the vehicle network bus 591. Communication agent 513 is operable to upload the predetermined data obtained from vehicle network bus 591 to network management system 141 of FIGS. 1, 2, 3.

Processor 440 is operable to acquire the predetermined data during time periods that wide area network interface 444 is not communicating with network management system 141. Communication agent 513 is operable to upload the predetermined data to network management system 141 upon occurrence of a predetermined event.

The predetermined event may comprise a predetermined time period that may be the time wide area network interface 444 is in communication with network management system 141 and/or the predetermined event is determined by the predetermined data, such as, for example, data that indicates deployment of an air bag.

Mobile router 112 stores the predetermined data in memory 567.

Processor 440 provides a time stamp for the predetermined data at the time the predetermined acquired data is acquired. The time stamp is stored in memory 567 in association with the corresponding predetermined data.

Processor 440 is operable to assign a priority for the predetermined data; and is operable to execute a predetermined action to take with the predetermined data.

Processor 440 is operable to initiate immediate upload of the predetermined data to network management system 141 of the predetermined data having a predetermined one assigned priority. By way of non-limiting example, data indicating deployment of air bags would be assigned a priority for immediate upload.

Processor 440 is operable to control upload of predetermined data having a first predetermined one assigned priority at a first data rate. Processor 440 is operable to control upload of second predetermined data having a predetermined second assigned priority at a second predetermined data rate, the second predetermined data rate being slower than the first predetermined data rate.

Communication agent 513 is operable to determine if uploading of the predetermined data is interrupted. Communication agent 513 is operable in cooperation with the communication server 133 to restore uploading of the predetermined data to network management system 141 from the point of interruption when a communication link between the network management system 141 communication server 133 and the communication agent 513 is restored.

Processor 440 is operable to process the predetermined data prior to the data being uploaded; and processor 440 is operable to store the processed predetermined data as the predetermined data in memory 567.

A time stamp is generated for the predetermined data when it is acquired. The time stamp is stored in memory 567 in association with the corresponding processed predetermined data.

Communication agent 513 may be further operable to determine when uploading occurs in cooperation with the application program or programs 565.

The predetermined data may comprise statistical data and/or diagnostic data. The diagnostic data is obtained via the vehicle network bus interface 571. Processor 440 is operable to process the diagnostic data to generate message data. Communication agent 513 is operable to upload the message data to network management system 141 via one of the local area network interface 446 and the wide area network interface 444.

Application or applications 565 is or are downloaded to the vehicle via one of the wide area network interface 444 and the local area network interface 446.

It will be appreciated by those skilled in the art that the various functions of each of the plurality of mobile routers 112 may be integrated directly into a vehicle 101. In that instance, a vehicle 101 may comprise a vehicle network bus 591; a local area network interface 546 comprising a first wireless transceiver 546A of a first predetermined type to provide a link 114 to first a local area network 115; a wide area network interface 444 comprising a second wireless transceiver 444A of a second predetermined type to provide a link 122 to a wide area network 120; processor 140 to control operation of the local area network interface 446 and the wide area network interface 444. At least one of the wide area network interface 446 and the local area network interface 444 is selectively operable to establish a wireless communication link with a network management system 141 comprising a communication server 133. Vehicle 101 further comprises a communication agent 441 and one or more applications 565 executable by processor 140 to selectively acquire predetermined data from the vehicle network bus 591. Communication agent 513 is operable to upload the predetermined data to network management system 141.

Data for uploading can be prioritized and rate limited by processor 140. By way of non-limiting example, if the data has a high priority, such as an indication of airbag deployment then the data is immediately prioritized over anything else and is uploaded. If the data has a low priority it can be sent at a low bit rate so as not to interfere with the experience of the user of mobile device 16 or anything the user might be doing. For example, low priority data may be "trickled up" or uploaded at 10 Kbps.

If the uploading of data from a mobile router 112 or vehicle 101 is interrupted for any reason the session, such as, for example, by loss of communications via a wireless wide area network communication link 122, mobile router 112 or processor 440 will restore the uploading of data where the uploading had left off, when a communication link is again established to communication server 133.

The number of mobile routers 112 may be very large, and may number millions of mobile routers 112 or other mobile devices. To efficiently provide an arrangement for tracking/monitoring the number of routers, a distributed network arrangement and method is provided for providing communication to the routers. More specifically, to support the ability of the system to scale up back-end systems that support mobile devices in vehicles that number from a few thousand to millions, we developed a method and architecture that allows for easy addition of capacity as the networked number of mobile routers increases.

Every mobile router 112 is configured to communicate with a communication server for uploading of data and for downloading content.

Figure 6:
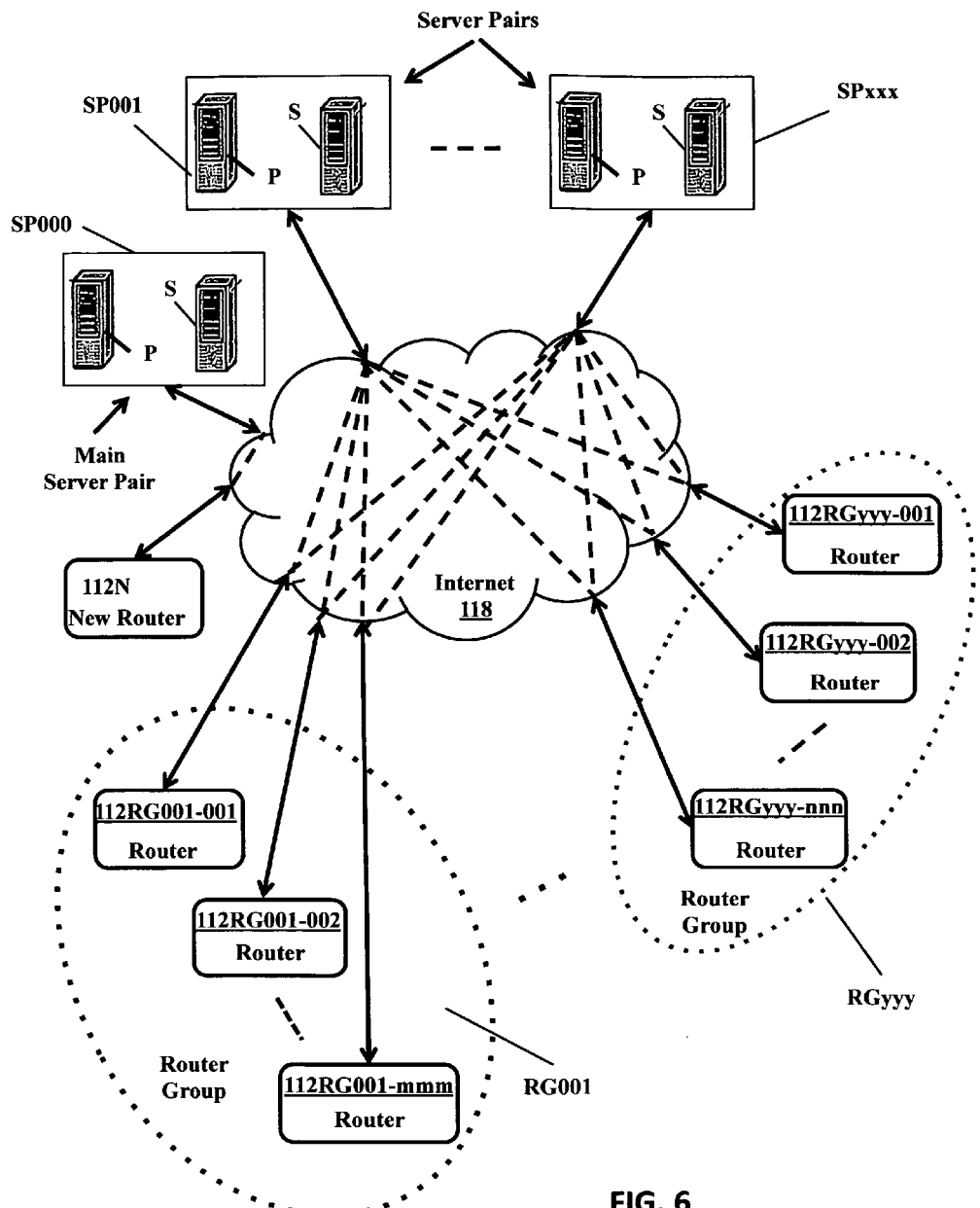
FIG. 6 illustrates details of an expandable router network.

Mobile router 112 comprises an interface 444 to a wireless communications link; a memory 442 storing information comprising configuration information 407; a memory 508 storing main server information utilizable to identify a main network server; and a communications agent 513 operable with the interface 444 to establish communication via the wireless communications link 122 to a network 600 shown in FIG. 6 comprising a main server SP000 and a plurality of group servers SP001 . . . SPxxx. Network 600 is an expanded version of network 100 shown in FIGS. 1, 2, and 3. Communications agent 513 is operable such that its initial communication to network 600 utilizes the main server information stored in memory 508 to establish a first communication with main server SP000. Mobile router 112 further comprises processor or microprocessor 440 operable with communications agent 513 to interact with main server SP000 to upload the configuration information from memory 407 to main server SP000 via network 600 shown in FIG. 6.

Communications agent 513 is operable to receive group server identification information from main server SP000 when communicating with main server SP000 a second time. Microprocessor 440 is operable to store the group server identification information in memory 508. The group server information comprises information identifying one or more servers corresponding with a predetermined group assigned by main server SP000. Communications agent 513 utilizes the group server identification information for subsequent communication via network 600.

The group server identification information is received by communications agent 513 from main server SP000 the second time mobile router 112 establishes communication with main server SP000. Communications agent 513 utilizes the group server identification information to access one group server of the plurality of group servers SP001, . . . , SPxxx.

The group server identification information comprises identification information for a predetermined number of group servers selectively assigned from the plurality of group servers SP001, . . . , SPxxx.

Turning back to FIG. 5, microprocessor 440 is operable to select a group server from the predetermined number of group servers with which to communicate via network 600. Microprocessor 440 selects the group server from the predetermined number of group servers in accordance with a predetermined selection algorithm. In one embodiment, the group server is selected by accessing the first available group server by attempting to access the group servers in sequential order as stored in memory 508.

Although the above description refers to each server in the singular, in an embodiment of the invention, each group server SP001, . . . , SPXXX shown in FIG. 6 comprises a corresponding pair of servers P, S that are identically configured.

One group server P, S of each group server pair operates as a primary server P to track and monitor the plurality of mobile routers and the corresponding paired server is selected as a backup secondary server S. Each primary group server P and its corresponding secondary server S operate such that data in primary group server P is replicated into its corresponding secondary server S.

Primary group server P and the secondary server S operate to determine if a failure occurs in the primary group server; and the primary group server P and the secondary server S operate to automatically switch to the secondary server as primary group server upon occurrence of a failure. After the original primary group server P is repaired, it is manually switched back in service.

The group server pairs SP001, . . . , SPxxx are dispersed to be located at dispersed geographic locations and have different network peering points.

When a new mobile router 112N is provisioned at the factory, it is configured to talk to the "main" communications server pair SP000 at the network operations center 141 shown in FIG. 1 by storing access information for "main" communications server pair SP000 in memory 508. Each newly provisioned mobile router 112N registers with the "main" communications server pair SP000 and uploads its configuration information to "main" communications server pair SP000. When mobile router 112N registers with the "main" communications server pair SP000 it calls into an "unassigned" server group address by default.

When mobile router 112N is sold and shipped it is assigned to a group selected from a plurality of groups RG001-RGyyy. The group to which a mobile router 112 is assigned is usually customer specific. Non-limiting examples of such customers to which a mobile router is assigned include automotive companies, e.g., Chrysler, or electronics retailers, e.g., Best Buy.

The next time mobile router 112N comes on line and talks to main communications server pair SP000, main communications server pair SP000 will identify that mobile router 112N has been assigned to a group selected from the groups RG001 through RGyyy that is different from the "unassigned" group. Main communications server pair SP000 will then reassign mobile router 112N to talk to a new communications server pair that handles the group to which mobile router 112N has been assigned by downloading the new communication server pair access information to memory 508. The new communications server pair is selected from the communications server pairs SP001 through SPxxx There can be multiple communications server pairs per group and each communications server can support multiple groups.

Each mobile router 112 is configured by the main communications server pair SP000 with addresses for multiple communications server pairs. The addresses for the multiple communication server pairs are stored in mobile router 112 memory 508 shown in FIG. 5. Memory 508 may be an assigned portion of memory 442 as shown or may be a separate memory. Each mobile router 112 will access the server addresses stored in its corresponding memory 508 in a predetermined order. If a communication server pair associated with a first address is unavailable, mobile router 112 will access the next address of a communications server stored in memory 508. Mobile router 112 will access communications server addresses from memory 508 in predetermined order until communications with a corresponding communications server is established.

Figure 7:
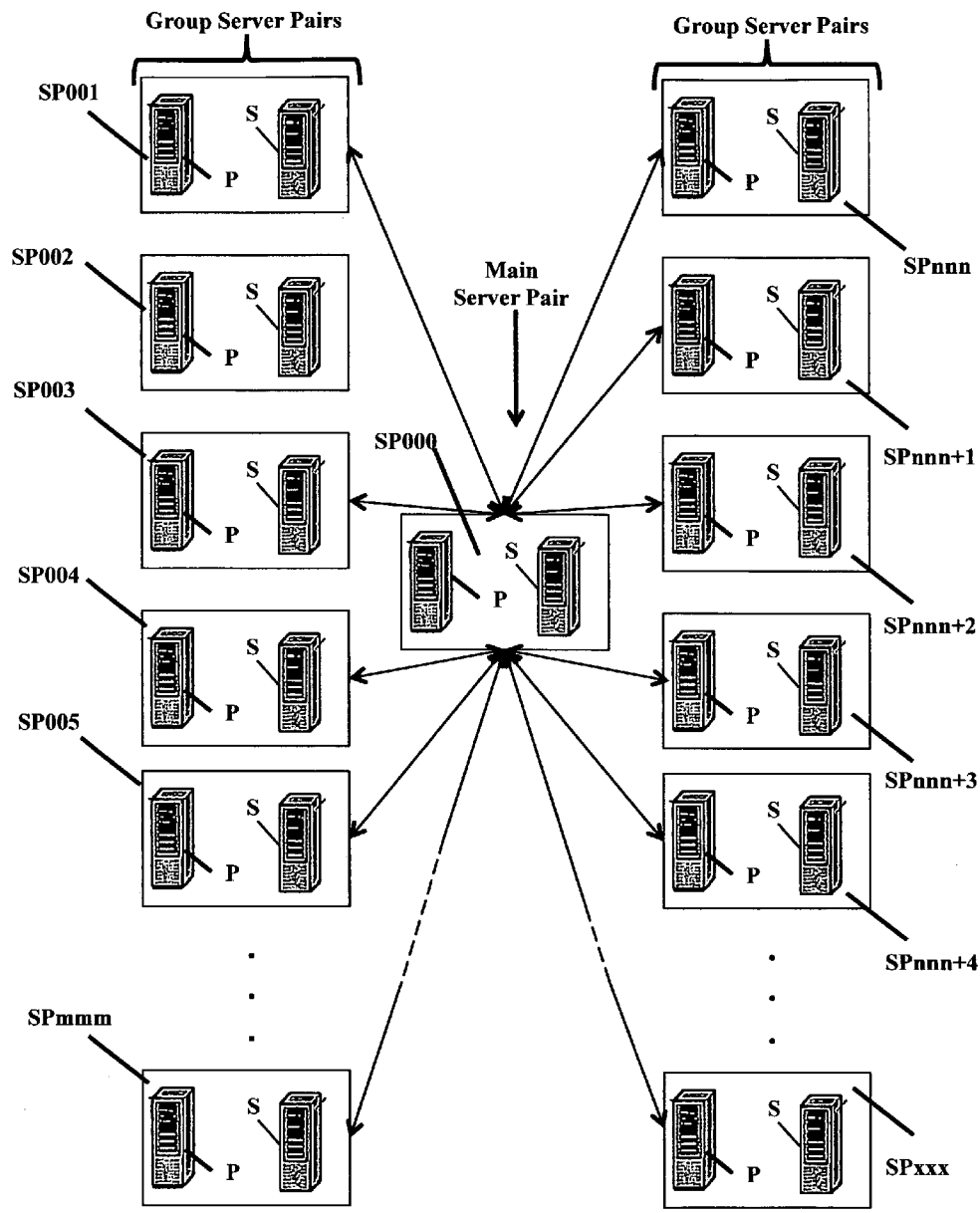
FIG. 7 illustrates further details of the network of FIG. 6.

Main server pair SP000 includes a manager program. The manager program is provided so that main server pair SP000 may communicate to all of communications servers SP001-SPXXX, so an operator of the network system never needs to know which communications server communicates with which router. The communication by main server pair SP000 to server pairs SP001-SPXXX is illustrated in FIG. 7.

Communications server pairs SP001-SPXXX do not need to be located in the same facility. It is preferable that the communications server pairs SP001-SPXXX are not in the same facility. It is highly preferable that the communications server pairs SP001-SPxxx are geographically disperse and have different network peering points.

With the server network architecture described above, added capacity is easily added by simply adding additional server pairs and configuring them as available within the system manager at the network operations center SP000.

In a particularly advantage embodiment of the invention each mobile router 112 may be operated in a "valet mode" in conjunction with a wireless mobile device such as, for example, a so-called smart phone. We provide an application, i.e., a valet application that may be downloaded to a smartphone or other wireless mobile device. The valet application is particularly advantages with a smartphone or other wireless mobile device having a touch screen. The valet application programs the wireless mobile device to provide a valet mode control button or icon. Touching the button causes a command to be sent to a corresponding mobile router to enable a valet mode in the mobile router.

When the valet mode is enabled in a mobile router, a predetermined boundary is established for the mobile router based on its location at the time the valet mode is enabled. By way of example, the predetermined boundary may be a radius may of e.g., 100 yards from the vehicles location. If the vehicle leaves moves outside the boundary, the mobile router causes a message, e.g., a SMS message, to be sent to the wireless mobile device alerting that the boundary has been exceeded.

When the valet mode is enabled, the corresponding mobile router also monitors the speed of the vehicle. If the speed exceeds a predetermined speed, e.g., 65 mph, the mobile router causes a message, e.g., a SMS message, to be sent to the wireless mobile device alerting that the predetermined speed has been exceeded.

Both the predetermined radius and the predetermined speed are automatically configured in the mobile router.

The mobile router automatically disables the valet mode a predetermined time period, e.g. 4 hours, after it is enabled.

The user of the wireless mobile device can change the predetermined default parameters for the radius, maximum speed, and time period.

Figure 8:
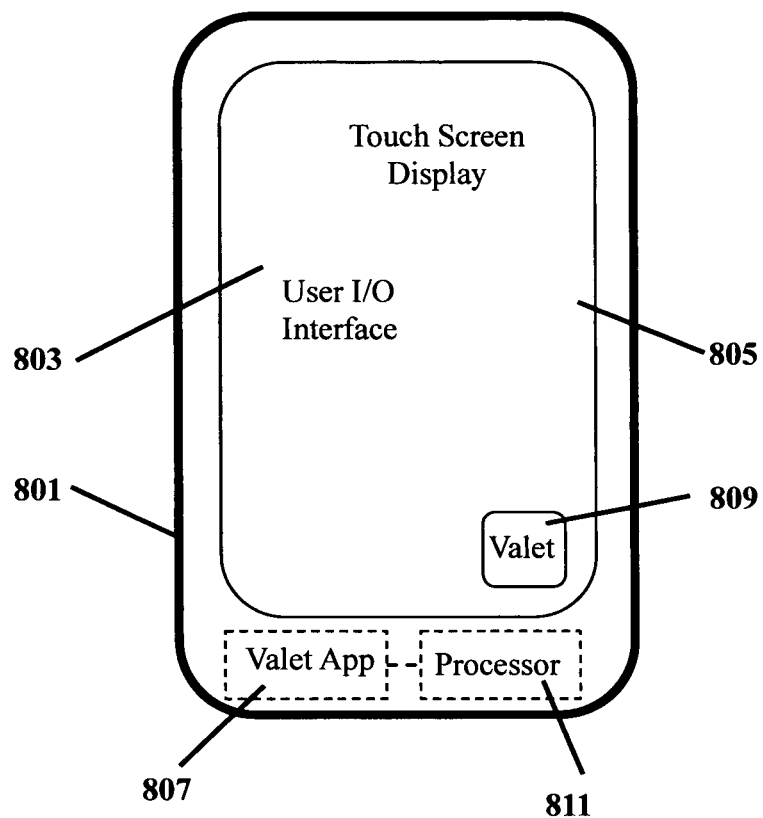
FIG. 8 illustrates a wireless mobile device.

FIG. 8 illustrates a wireless mobile device 801 having digital communication capability. In various embodiments, wireless mobile device 801 may be a any one of a number of wireless mobile devices, including, for example, a smartphone or a tablet or pad type computer. Wireless mobile device 801 and comprises a user input/output interface 803 comprising a touch screen display 805. A valet mode application 807 is stored in the wireless mobile device 801. Valet mode application 807 is executable by the wireless mobile device 801 to provide control for a valet mode in cooperation with a mobile router 112 disposed within a vehicle 101. Wireless mobile device 801 executes the valet mode application 807 to produce a predetermined image 809 on touch screen display 805. Touch screen display 805 is operable such that touching predetermined image 809 is utilized to activate and deactivate a valet mode operation in mobile router 112. The valet mode operates mobile router 112 such that when the vehicle exceeds one or more predetermined conditions, mobile router 112 provides a notification to wireless mobile device 801.

Predetermined image 809 may be an image of a button or an icon or other image. Wireless mobile device 801 is operable in response to a touch of predetermined image 809 to cause activation of the valet mode in its corresponding mobile router 112. Wireless mobile device 801 is operable in response to a subsequent touch of predetermined image 809 to cause deactivation of the valet mode in mobile router 112.

The one or more predetermined conditions are preset in mobile router 112. The predetermined conditions may comprise one or both of a boundary determined by a predetermined radius, e.g., 100 yards and a predetermined vehicle speed, e.g. 65 mph.

The valet mode in mobile router 112 remains activated for a predetermined time period, e.g., 4 hours. However, wireless mobile device 801 may deactivate the valet mode by a subsequent touching of predetermined image 809.

Wireless mobile device 801 is operable to change the one or more predetermined conditions. Wireless mobile device 801 may selectively change one or more of the predetermined radius, predetermined speed, and predetermined time period to a user determined condition. The predetermined conditions are stored in the corresponding mobile router 112.

Valet mode application 807 may be downloaded to a wireless mobile device 801 by accessing a server, such as server 145 shown in FIG. 1. Turning back to FIG. 8, after valet mode application 807 is downloaded to wireless mobile device 801, wireless mobile device 801 executes valet mode application 807 setup. As part of the setup, a valet mode button or other predetermined image 809 is provided on touch screen display 805. Wireless mobile device 801 uploads an identification of a specific corresponding mobile router of a plurality of mobile routers 112 to server 145 so that wireless mobile device 801 is associated with the specific corresponding mobile router 112 of the plurality of mobile routers 112.

Server 145 either downloads a corresponding valet mode application 571 to mobile router 112 or if the valet mode application 571 is already resident in mobile router 112, server 145 activates the valet mode application. As part of the setup of valet mode application 145 in mobile router 112, the predetermined conditions are stored in mobile router 112 if they are not already stored therein.

One embodiment of the invention is an application for use with a wireless mobile device 801 comprising a touch screen display 805. Valet mode application 807 is downloadable to and stored by wireless mobile device 801. Valet mode application 807 is executable by wireless mobile device 801 to provide control for a valet mode in mobile router 112 disposed within vehicle 101. Valet mode application is executable by wireless mobile device to produce a predetermined image 809 on touch screen display 805. Valet mode application 807 is executable such that touching predetermined image 809 is utilized to cause a command to be sent to mobile router 112 to activate and deactivate a valet mode operation in mobile router 112. Valet mode operates in mobile router 112 such that when the vehicle in which mobile router 112 is installed exceeds one or more predetermined conditions, mobile router 112 provides a notification to wireless mobile device 801.

The one or more predetermined conditions are preset in mobile router 112. However, valet mode application 807 is executable by wireless mobile device 801 to change the one or more predetermined conditions. As described above, the predetermined conditions comprise a predetermined distance radius 573, a predetermined vehicle speed 575, and a predetermined time limit 577.

Predetermined image 809 may comprise one or both of a button and an icon. Wireless mobile device 801 is operable in response to a touch of predetermined image 809 to activate the valet mode in the mobile router 112. Wireless mobile device 801 is operable in response to a second touch of predetermined image 809 to cause deactivation of the valet mode in mobile router 112.

Valet mode application 571 is loaded in mobile router 112 to provide valet mode functionality for vehicle 101 in which mobile router 112 is disposed. Processor 440 is operable to execute valet mode program 571.

Mobile router 112 responds to externally generated commands originating at wireless mobile device 801 to activate or deactivate the valet mode in mobile router 112. Processor 440 is operable to determine if the predetermined distance limit is exceeded from the location of the vehicle when the valet mode is activated; and processor 440 is operable to determine if the vehicle exceeds the predetermined speed limit when the valet mode is activated.

Processor 440 deactivates the valet mode at the earliest of expiration of predetermined time period 577 and receipt of a deactivate command from wireless mobile device 801.

Mobile router 112 also responds to externally generated commands originating at wireless mobile device 801 to change predetermined time period 577 to a second predetermined time period and responds to externally generated commands to change the predetermined distance limit 573 to a second predetermined distance period and responds to commands to change the predetermined speed limit 575 to a second predetermined speed period. Processor 440 may automatically reset the predetermined time limit, predetermined distance, and predetermined speed limit to the initial values upon termination of the valet mode.

Predetermined distance limit 573, predetermined speed limit 575, and predetermined time period 577 are downloaded to mobile router 112 via one of wireless wide area network interface 444 and wireless local area network interface 446.

Mobile router 112 is operable to generate a predetermined message to wireless mobile device 801 if at least one of predetermined speed limit 573 or predetermined distance 575 is exceeded. The predetermined message is stored in memory 442 in association with valet mode application 571, as is contact information for wireless mobile device 801.

Mobile router 112 has access to a global positioning system (GPS) receiver 593. Mobile router 112 utilizes GPS receiver 593 to substantially continuously determine the location of vehicle 101 in which mobile router 112 is disposed. Mobile router 112 is responsive to a first command to activate an operational mode such that the present location of vehicle 101 is captured from GPS receiver 593. The location of vehicle 101 is, thereafter during activation of the valet mode, substantially continuously monitored and utilized to determine if the current location of vehicle 101 exceeds the predetermined distance limit 573 from the captured location and to determine if vehicle 101 exceeds the predetermined speed limit 575. Alternatively, mobile router 112 may utilize odometer data and speed data available on vehicle standard bus 591 to determine the distance traveled by vehicle 101 and the speed at which vehicle 101 travels.

A vehicle 101 in accordance with the principles of the invention comprises a valet mode program 571 to provide valet mode functionality, a processor 440 operable to execute the valet mode program 571, a predetermined distance limit 573, and a predetermined speed limit 575. Vehicle 101 responds to externally generated commands from a predetermined source 801 to activate or deactivate the valet mode. Processor 440 is operable to determine if the predetermined distance limit 573 is exceeded from the location of vehicle 101 when the valet mode is activated, and processor 440 is operable to determine if vehicle 101 exceeds predetermined speed limit 575 while the valet mode is activated.

Vehicle 101 further comprises wireless wide area network interface 444 operable to access a cellular network 120, and a wireless local area network interface 446. Commands are received via one of wireless wide area network interface 444 and wireless local area network interface 446.

The predetermined source in vehicle 101 may comprise a wireless mobile device 116 that may be the wireless mobile device 801 shown in FIG. 8. Wireless mobile device 801 comprises a valet mode application operable to activate and deactivate the valet mode in vehicle 101.

Vehicle 101 further comprises a predetermined time period 577. Processor 440 deactivates the valet mode at the earliest of the predetermined time period 577 and receipt of a deactivate command. Processor 440 responds to externally generated second commands from wireless mobile device 801 to change the predetermined time period 577 to a second predetermined time period. Processor 440 responds to externally generated third commands from wireless mobile device 801 to change the predetermined distance limit to a second predetermined distance period. Processor 440 responds to externally generated fourth commands from wireless mobile device 801 to change the predetermined speed limit 577 to a second predetermined speed period.

The predetermined distance limit 573 and the predetermined speed limit 575 are downloaded to vehicle 101 via one of the wireless wide area network interface 444 and the wireless local area network interface 446.

Processor 440 is operable to generate a message to wireless mobile device 801 if at least one of the predetermined speed limit 573 or the predetermined distance 575 is exceeded.

Vehicle 101 may further comprise a global positioning system (GPS) receiver 593 and a mobile router. Vehicle 101 utilizes GPS receiver 593 to substantially continuously determine the location of the vehicle. Processor 440 is responsive to a first command to activate an operational mode such that the present location of vehicle 101 is captured. The location of vehicle 101 is substantially continuously monitored by processor 440 to determine if the location of vehicle 101 exceeds the predetermined distance limit 573 from the initial captured location and to determine if vehicle 101 exceeds the predetermined speed limit. Alternatively, mobile router 112 may utilize odometer data and speed data available on vehicle standard bus 591 to determine the distance traveled by vehicle 101 and the speed at which vehicle 101 travels.

Processor 440 is responsive to vehicle 101 exceeding predetermined distance 573 from the initial captured location to send a message to a wireless mobile device 801.

Processor 440 is responsive to vehicle 101 exceeding predetermined speed 575 to send a message to wireless mobile device 801.

Processor 440 may be responsive to a second command to deactivate the operational mode.

Figure 9:
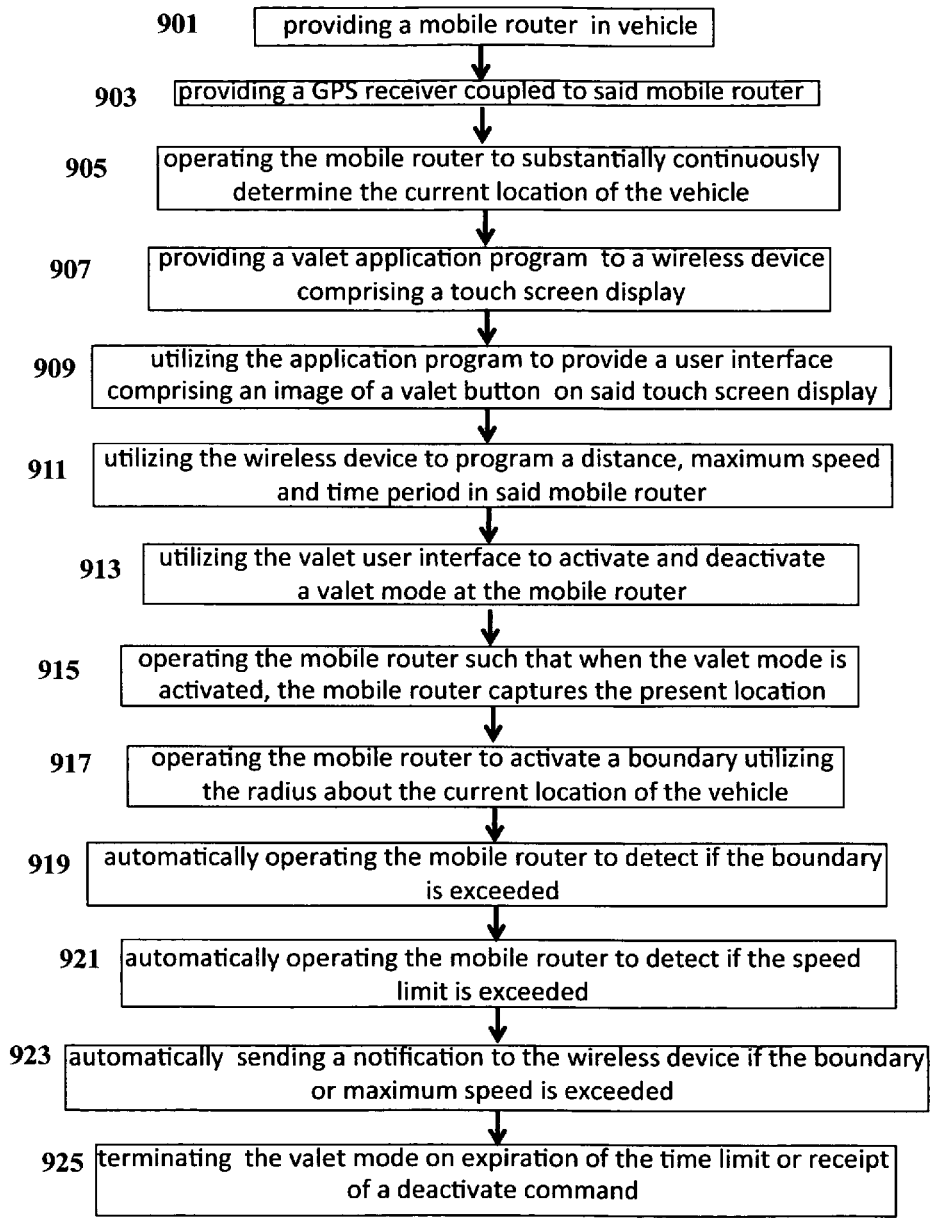
FIG. 9 illustrates steps of a method.

FIG. 9 illustrates a method for providing a valet mode for a vehicle 101. The method includes: the step 901 of providing a mobile router in a vehicle; providing a GPS receiver in the vehicle at step 903; operating the mobile router to substantially continuously determine the current location of the vehicle at step 905; providing a valet application program to a wireless mobile device comprising a touch screen display at step 907; utilizing the valet application program to provide a user interface comprising an image such as, for example a button or other icon at step 909; utilizing the wireless device to program in the mobile router a radius for use as a boundary, a maximum permitted speed, and a predetermined time period that the valet mode will be activated at step 911; utilizing the user interface to activate and deactivate a valet mode at the mobile router at step 913; operating mobile router such that when the valet mode is activated, the current location is captured at step 915; operating the mobile router to activate a boundary utilizing the predetermined radius about the current location of vehicle at step 917; automatically operating the mobile router when the valet mode is activated to detect if the boundary is exceeded at step 919; automatically operating the mobile router when the valet mode is activated to detect if the maximum speed limit is exceeded at step 921; operating the mobile router to automatically cause a notification to be sent to the wireless mobile device if the boundary and/or the speed limit is exceeded at step 923; and terminating the valet mode in the mobile router upon the earliest of expiration of the time period or receipt of a deactivate command.

Alternatively, mobile router 112 may utilize odometer data and speed data available on vehicle standard bus 591 to determine the distance traveled by vehicle 101 and the speed at which vehicle 101 travels. The method may further comprise: coupling the router to a standardized vehicle bus; obtaining distance traveled by the vehicle from the vehicle bus; and obtaining vehicle speed from the vehicle bus.

The method may further include downloading the valet application to the wireless device from a source accessed via the Internet.

In yet another embodiment, a method is provided for operating a network comprising a plurality of mobile routers 112 each disposed in a corresponding vehicle 101 as shown in FIGS. 1 and 2 and each mobile router 112 comprising a wireless wide area network interface 440 and a wireless local area network interface 444 as shown in FIG. 5. The method comprises: downloading a valet mode application 809 to a wireless mobile device 801 shown in FIG. 8; utilizing the valet mode application to program wireless mobile device 801 to provide a valet user interface 809. Wireless mobile device 801 comprising a touch screen display 805 and has access to at least one of a device wireless local area network 115 and a device wireless wide area network 120 shown in FIG. 1. The method further comprises: utilizing the valet mode application 807 to produce an image of a button 809 on touch screen display 805; associating one or more of the mobile routers 112 to wireless mobile device 801; providing each associated one or more the mobile routers 112 with a valet mode program 571; coupling a global positioning system (GPS) receiver 593 to mobile router 112 as shown in FIG. 5; utilizing button 809 to activate and deactivate a valet mode such that when the valet mode is activated, mobile router 112 and the GPS receiver 593 cooperate to establish a predetermined radius 573 about the current location of the vehicle; and operating mobile router 112 in cooperation with the GPS receiver 593 to detect if predetermined radius 571 is exceeded.

The method further comprises operating mobile router 112 to establish a predetermined maximum speed 575; operating mobile router 112 to detect if the predetermined radius 573 or the predetermined maximum speed 575 is exceeded; and operating the mobile router to cause a notification to be sent to the wireless device upon the router detecting if the predetermined radius or the predetermined speed is exceeded.

It will be appreciated by those skilled in the art that various changes and modifications may be made to the embodiments described herein without departing from the spirit or scope of the invention. It is intended that the invention not be limited in any way by the embodiments shown and described herein, but that the invention be limited only by the claims appended hereto.

What is claimed is:

1. A method for providing a valet mode for a vehicle, said valet mode selectively operable to determine whether said vehicle has moved more than a predetermined radius from an initial location determined at the time said valet mode is activated or has traveled at a speed in excess of a predetermined speed while said valet mode is activated, said method comprising:
providing a mobile router in said vehicle, said mobile router comprising a wireless wide area network transceiver to access a wide area network, and a mobile wireless local area network movable with said vehicle comprising a wireless local area network transceiver, said mobile router operable to connect a wireless mobile device in said vehicle to said mobile wireless local area network and to maintain a connection to said wide area network;
providing said mobile router with a valet mode program executable to provide said valet mode operable to determine whether said vehicle has moved more than said predetermined radius from said initial location or has traveled at a speed in excess of said predetermined speed;
operating said mobile router to determine said initial location of said vehicle;
providing a valet application program to a wireless device;
utilizing said valet application program to program said wireless device to provide a valet user interface, said valet application program being executable by said wireless device such that said wireless device is usable to activate and deactivate said valet mode;
utilizing said valet user interface to activate and deactivate said valet mode via one of said wireless wide area network interface and said wireless local area network interface;
operating said mobile router such that at the time said valet mode is activated, said mobile router determines said initial location of said vehicle and activates a predetermined boundary of predetermined radius about said initial location of said vehicle;
automatically operating said mobile router when said valet mode is activated to detect if said vehicle travels beyond said predetermined boundary; and
operating said mobile router to automatically cause a notification to be sent to said wireless device via one of said wide area network and said mobile wireless local area network upon said mobile router detecting that said vehicle travels beyond said predetermined boundary.

2. The method of claim 1, comprising:
providing said valet application program to said wireless device as a downloadable program from a source accessed via an Internet.

3. The method of claim 1, comprising:
operating said mobile router in said valet mode for a predetermined period of time after said valet mode is activated; and
automatically deactivating said valet mode upon expiration of said predetermined period.

4. The method of claim 1, comprising:
utilizing said valet user interface to select said predetermined radius.

5. The method of claim 4, comprising:
storing said predetermined radius in said mobile router.

6. The method of claim 5, comprising:
coupling said mobile router to a standardized vehicle bus; and
obtaining distance traveled by said vehicle from said standardized vehicle bus.

7. The method of claim 5, comprising:
providing said vehicle with a global positioning system (GPS) receiver coupled to said mobile router; and
utilizing said GPS receiver in cooperation with said mobile router to obtain distance traveled by said vehicle.

8. The method of claim 2, wherein:
said wireless device comprises at least one of a link to a device wireless local area network and a link to a device wireless wide area network.

9. The method of claim 8, comprising:
downloading said valet application program to said wireless device via one of said device wireless local area network and said device wireless wide area network.

10. The method of claim 8, comprising:
operating said wireless device to deactivate said valet mode at said mobile router via one of said device wireless local area network and said device wireless wide area network; and
deactivating said valet mode via one of said mobile router wireless local area network transceiver and said mobile router wireless wide area network transceiver.

11. The method of claim 2, comprising:
operating said mobile router to send said notification to said wireless device via one of said mobile router wireless local area network transceiver and mobile router wireless wide area network transceiver.

12. The method of claim 1, comprising:
providing said vehicle with a global positioning system (GPS) receiver coupled to said mobile router; and
operating said mobile router to utilize said GPS receiver to obtain said initial location.

13. The method of claim 12, comprising:
operating said mobile router to obtain a current location of said vehicle; and
to determine if said current location exceeds said predetermined radius from said initial location.

14. The method of claim 13, comprising:
operating said mobile router in said valet mode for a predetermined period of time after said valet mode is activated; and
automatically deactivating said valet mode upon expiration of said predetermined period.

15. The method of claim 14, comprising:
utilizing said valet user interface to select said predetermined radius and said predetermined period of time.

16. The method of claim 15, comprising:
storing said selected predetermined radius and said selected predetermined period of time in said mobile router.

17. A method for providing a valet mode for a vehicle, said valet mode selectively operable to determine whether said vehicle has moved more than a predetermined radius from an initial location determined at the time said valet mode is activated or has traveled at a speed in excess of a predetermined speed while said valet mode is activated, said method comprising:
providing a mobile router in said vehicle, said mobile router comprising a mobile router wireless wide area network interface to access a wide area network, a mobile wireless local area network and a mobile router wireless local area network interface to access said mobile wireless local area network, said mobile router operable to provide a connection for a wireless mobile device in said vehicle with said wide area network and with said mobile wireless local area network while said vehicle is mobile and stationary, said mobile router operable to communicate with a network operations center via a selected one of said wide area network and said mobile wireless local area network;
providing said mobile router with a valet mode program, said valet mode program being executable by said mobile router to provide said valet mode;
providing said vehicle with a global positioning system (GPS) receiver;
coupling said GPS receiver to said mobile router;
providing a valet application program to a wireless device, said valet application program executable to communicate commands to said mobile router to control said valet mode, said wireless device comprising a touch screen display, said wireless device having access to at least one of a device wireless local area network and a device wireless wide area network;
utilizing said valet application program to provide a valet user interface comprising an image on said touch screen display;
utilizing said image to activate and deactivate said valet mode; activating said valet mode via a selected one of said mobile router wireless wide area network interface and said mobile muter wireless local area network interface;
operating said mobile router to capture said initial location of said vehicle from said GPS receiver when said valet mode is activated;
operating said mobile router ha cooperation with said GPS receiver to establish a predetermined radius about said initial location of said vehicle;
operating said mobile router in cooperation with said GPS receiver, while said valet mode is activated, to detect if a current location of said vehicle exceeds said predetermined radius from said initial location; and
operating said mobile router to Send a notification message to said wireless device when said mobile router detects said predetermined radius is exceeded.

18. The method of claim 17, comprising:
operating said mobile router in said valet mode for a predetermined period of time after said valet mode is activated; and
automatically deactivating said valet mode upon expiration of said predetermined period.

19. The method of claim 18, comprising:
utilizing said valet user interface to select said predetermined radius and said predetermined period of time.

20. The method of claim 19, comprising:
storing said predetermined radius and said predetermined period of time in said mobile router.

21. The method of claim 17, comprising:
downloading said valet application program to said wireless device via one of said device wireless local area network and said device wireless wide area network.

22. The method of claim 21, comprising:
utilizing said valet application program to associate said mobile router with said wireless device.

23. The method of claim 17, comprising:
operating said mobile router to send a notification message to said wireless device via one of said mobile wireless local area network and said mobile router wireless wide area network interface when said mobile router detects said predetermined radius is exceeded.

24. A method for providing a valet mode for a vehicle, said valet mode selectively operable to determine whether said vehicle has moved more than a predetermined radius from an initial location determined at the time said valet mode is activated or has traveled at a speed in excess of a predetermined speed while said valet mode is activated, said method comprising:
providing a mobile router in said vehicle, said mobile router comprising a wireless wide area network interface for connecting to a cellular network and a wireless local area network interface for connecting to a mobile wireless local area network, said mobile router operable to provide a connection for a wireless mobile device in said vehicle with said mobile wireless local area network and said wireless wide area network, said mobile router comprising a valet mode program, said valet mode program executable to provide said valet mode;
operating said mobile router to determine a current location of said vehicle;
providing a valet application program to a wireless device programmable to comprise a customizable user interface, said wireless device having access to at least one of a device wireless local area network and said cellular network, said valet application program executable to determine to control said valet mode;
utilizing said valet application program to program said wireless device to provide a valet user interface;
utilizing said valet user interface to activate and deactivate said valet mode at said mobile router;
activating said valet mode via a selected one of said mobile wireless local area network and said cellular network;
operating said mobile router such that when said valet mode is activated, said mobile router captures an initial location of said vehicle determined at the time of activation and activates a predetermined boundary of predetermined radius about said initial location of said vehicle and activates a maximum speed limit for said vehicle;
operating said mobile router while said valet mode is activated to detect if a current location of said vehicle exceeds said predetermined radius from said initial location or if said maximum speed limit is exceeded; and
operating said mobile router to cause a notification to be sent to said wireless device upon said mobile router detecting that said vehicle exceeds said predetermined radius from said initial location or exceeds said maximum speed limit.

25. The method of claim 24, comprising:
providing said valet application program to said wireless device as a downloadable program from a source accessed via an Internet.

26. The method of claim 24, comprising:
operating said mobile router in said valet mode for a predetermined period of time after said valet mode is activated; and
automatically deactivating said valet mode upon expiration of said predetermined period.

27. The method of claim 26, comprising:
utilizing said valet user interface to select said predetermined radius, said maximum speed limit and said predetermined period of time.

28. The method of claim 27, comprising:
storing said predetermined radius, said maximum speed limit and said predetermined period of time in said mobile router.

29. The method of claim 28, comprising:
coupling said mobile router to a standardized vehicle bus;
obtaining distance traveled by said vehicle from said standardized vehicle bus; and
obtaining vehicle speed from said standardized vehicle bus.

30. The method of claim 28, comprising:
providing said vehicle with a global positioning system (GPS) receiver coupled to said mobile router;
utilizing said GPS receiver in cooperation with said mobile router to determine distance traveled by said vehicle from said initial location; and
utilizing said GPS receiver in cooperation with said mobile router to determine vehicle speed.

31. The method of claim 25, comprising:
downloading said valet application program to said wireless device via one of said device wireless local area network and said cellular network.

32. The method of claim 31, comprising:
utilizing said valet application program to associate said mobile router with said wireless device.

33. The method of claim 24, comprising:
providing said vehicle with a global positioning system (GPS) receiver coupled to said mobile router;
operating said mobile router to utilize said GPS receiver to determine distance traveled by said vehicle; and
operating said mobile router to utilize said GPS receiver to determine vehicle speed.

34. The method of claim 33, comprising:
operating said mobile router to send said notification to said wireless device when said mobile router detects said one or both of said predetermined radius from said initial location and said maximum speed limit are exceeded.

35. The method of claim 34, comprising:
operating said mobile router in said valet mode for a predetermined period of time after said valet mode is activated; and
automatically deactivating said valet mode upon expiration of said predetermined period.

36. The method of claim 35, comprising:
utilizing said valet user interface to select said predetermined radius, said maximum speed limit and said predetermined period of time.

37. The method of claim 36, comprising:
storing said predetermined radius, said maximum speed limit and said predetermined period of time in said mobile router.

38. A method for providing a valet mode for a vehicle, said valet mode selectively operable to determine whether said vehicle has moved more than a predetermined radius from an initial location determined at the time said valet mode is activated or has traveled at a speed in excess of a predetermined speed while said valet mode is activated, said method comprising:
providing a mobile router in said vehicle, said mobile router comprising a mobile router wireless wide area network interface to access a cellular network, a mobile wireless local area network, and a mobile router wireless local area network interface to access said mobile wireless local area network, said mobile router operable to provide a connection to said cellular network for a wireless mobile device in said vehicle via said mobile router wireless wide area network interface and said mobile wireless local area network;
providing said mobile router with a valet mode program, said valet mode program executable to provide said valet mode to determine whether said vehicle has moved more than a predetermined radius from said initial location or has traveled at a speed in excess of a predetermined speed;
providing said vehicle with a global positioning system (GPS) receiver; coupling said GPS receiver to said mobile router;
providing a valet application program to a wireless device comprising a touch screen display, said wireless device having access to at least one of a device wireless local area network and a device wireless wide area network;
utilizing said valet application program to provide a valet user interface comprising an image on said touch screen display;
utilizing said image to activate and deactivate said valet mode such that when said valet mode is activated, said mobile router and said GPS receiver cooperate to establish a boundary comprising a predetermined radius about said initial location of said vehicle and to establish a maximum speed limit for said vehicle;
activating said valet mode via a selected one of said device wireless local area network and said device wireless wide area network and via a selected one of said wireless wide area network interface and said mobile wireless local area network;
operating said mobile router while said valet mode is activated in cooperation with said GPS receiver to detect if a current location of said vehicle is outside said boundary from said initial location or if said maximum speed limit is exceeded; and
operating said mobile router to send a notification message to said wireless device when said mobile router detects that one or both of said boundary and said maximum speed limit are exceeded.

39. The method of claim 38, comprising:
operating said mobile router in said valet mode for a predetermined period of time after said valet mode is activated; and
automatically deactivating said valet mode upon expiration of said predetermined period.

40. The method of claim 39, comprising:
utilizing said valet user interface to select said predetermined radius, said maximum speed limit and said predetermined period of time.

41. The method of claim 40, comprising:
storing said predetermined radius, said maximum speed limit and said predetermined period of time in said mobile router.

42. The method of claim 38, comprising:
downloading said valet application program to said wireless device via one of said device wireless local area network and said device wireless wide area network.

43. The method of claim 42, comprising:
utilizing said valet application program to associate said mobile router with said wireless device such that said wireless device is operable to control said valet mode.

* * * * *